United States Patent [19]

Fischer et al.

[11] Patent Number: 5,008,879
[45] Date of Patent: Apr. 16, 1991

[54] LAN WITH INTEROPERATIVE MULTIPLE OPERATIONAL CAPABILITIES

[75] Inventors: Michael A. Fischer; William M. Cox; Floyd H. McDougall, all of San Antonio, Tex.

[73] Assignee: Datapoint Corporation, San Antonio, Tex.

[21] Appl. No.: 270,641

[22] Filed: Nov. 14, 1988

[51] Int. Cl.$^5$ .............................. H04J 3/02; H04J 3/24
[52] U.S. Cl. ..................................... 370/85.2; 370/84; 370/85.1; 370/85.3; 370/85.4; 370/85.5; 370/94.1; 370/94.3; 340/825.5; 340/825.52
[58] Field of Search ..................... 370/84, 94.1, 94.3, 370/85.1, 85.2, 85.3, 85.4, 85.5, 85.13, 85.14, 85.12, 85.15, 60, 85.6, 85.7, 85.8; 340/825.5, 825.51, 825.52, 825.05

[56] References Cited

U.S. PATENT DOCUMENTS

| | | |
|---|---|---|
| 3,087,065 | 4/1963 | Mutschler . |
| 3,337,691 | 8/1967 | Litchman . |
| 3,482,101 | 12/1969 | Slaymaker . |
| 3,532,890 | 10/1970 | Denton . |
| 3,571,756 | 3/1971 | Skoog et al. . |
| 3,621,139 | 11/1971 | Gibson . |
| 3,689,699 | 9/1972 | Brenig et al. . |
| 3,733,550 | 5/1973 | Tazaki et al. . |
| 3,755,676 | 8/1973 | Kinsel . |
| 3,775,688 | 11/1973 | Hinoshita et al. . |
| 3,851,252 | 11/1974 | Karnaugh et al. . |
| 3,979,561 | 9/1976 | Hinkle et al. . |
| 3,985,423 | 10/1976 | Tseng ............................... 350/96 |
| 4,062,618 | 12/1977 | Steensma ........................... 350/3.5 |
| 4,101,734 | 7/1978 | Dao ................................... 178/68 |
| 4,161,628 | 7/1979 | McRae ............................... 178/69 A |
| 4,206,320 | 6/1980 | Keasler et al. ..................... 370/19 |
| 4,258,433 | 3/1981 | Herschtal et al. .................. 370/84 |
| 4,326,289 | 4/1982 | Dickinson .......................... 370/85.8 |

(List continued on next page.)

[57] ABSTRACT

Two different communication protocols are interoperatively combined for use in a local area network (LAN). An enhanced protocol can be selected as an alternative to a common protocol during communication between enhanced nodes of the LAN. Signals communicated between nodes of the LAN in the first and second protocols create the appearance of valid activity in both protocols, and always communicate at least some valid information in one of the protocols and selectively communicate additional valid information in a second protocol. Preferably the signals applied in the second or enhanced protocol include signals which are inserted in such a way that they are transparent to the first protocol. Improved network management capabilities and data transfer rates are available as a result of the information communicated in the second protocol.

115 Claims, 12 Drawing Sheets

OTHER PUBLICATIONS

800 MB/s PCM Multilever Transmission System over Coaxial Cables by Aratoni & Fukinuki.
Excerpt of Chapter 2 from "A Commonsense Approach to the Theory of Error Correcting Codes", Benjamin Arazi, The MIT Press, 1988.
Excerpt from "Error Detecting Codes, Self-Checking Circuits and Applications", by John Wakerly, 1982.
Excerpt of "Microcomputer Interfacing" by Harold S. Stone, 1983.
Excerpt from "Circuits and Application Seminar" by Fairchild pertaining to Data Synchronizer, published 1982.
"Anomalous Behavior of Synchronizer and Arbiter Circuits" by Thomas J. Chaney and Charles E. Molnar published in an unknown publication.
Article "Designers Confront Metastability in Boards and Buses", by John Beaston and R. Scott Tetrick, Computer Design, Mar. 1, 1986.

Primary Examiner—Douglas W. Olms
Assistant Examiner—Alpus H. Hsu
Attorney, Agent, or Firm—John R. Ley

U.S. PATENT DOCUMENTS

| Number | Date | Name | Class |
|---|---|---|---|
| 4,339,818 | 7/1982 | Gruenberg | 370/112 |
| 4,348,075 | 9/1982 | Gottlieb et al. | 350/96.13 |
| 4,386,323 | 5/1983 | Jansen | 375/119 |
| 4,451,827 | 5/1984 | Kahn et al. | 370/85.2 |
| 4,534,040 | 8/1985 | Thapar | 375/39 |
| 4,575,860 | 3/1986 | Scordo | 375/110 |
| 4,599,732 | 7/1986 | LeFever | 375/13 |
| 4,602,365 | 7/1986 | White et al. | 370/89 |
| 4,649,535 | 3/1987 | Ulug | 370/86 |
| 4,675,671 | 6/1987 | Ishizuka et al. | 340/825.05 |
| 4,675,880 | 6/1987 | Davarian | 375/39 |
| 4,700,185 | 10/1987 | Balph et al. | 370/85.13 |
| 4,701,908 | 10/1987 | Ikeda | 370/85 |
| 4,713,817 | 12/1987 | Wei | 371/43 |
| 4,752,924 | 6/1988 | Darnell et al. | 370/86 |
| 4,756,007 | 7/1988 | Qureshi et al. | 370/84 |
| 4,757,497 | 7/1988 | Beierle et al. | 370/89 |
| 4,771,286 | 9/1988 | Niessen et al. | 340/825.52 |
| 4,780,889 | 10/1988 | Ley et al. | 375/106 |
| 4,782,482 | 11/1988 | Kiatipov et al. | 370/85.15 |
| 4,789,982 | 12/1988 | Coden | 370/85 |
| 4,792,944 | 12/1988 | Takahashi et al. | 370/84 |
| 4,797,879 | 1/1989 | Habbab et al. | 370/94.1 |
| 4,821,296 | 4/1989 | Cordell | 375/119 |
| 4,841,551 | 6/1989 | Avaneas | 375/118 |
| 4,855,997 | 8/1989 | Wilson et al. | 370/85 |
| 4,896,338 | 1/1990 | Rouillet et al. | 375/119 |
| 4,907,224 | 3/1990 | Scoles et al. | 370/85.2 |

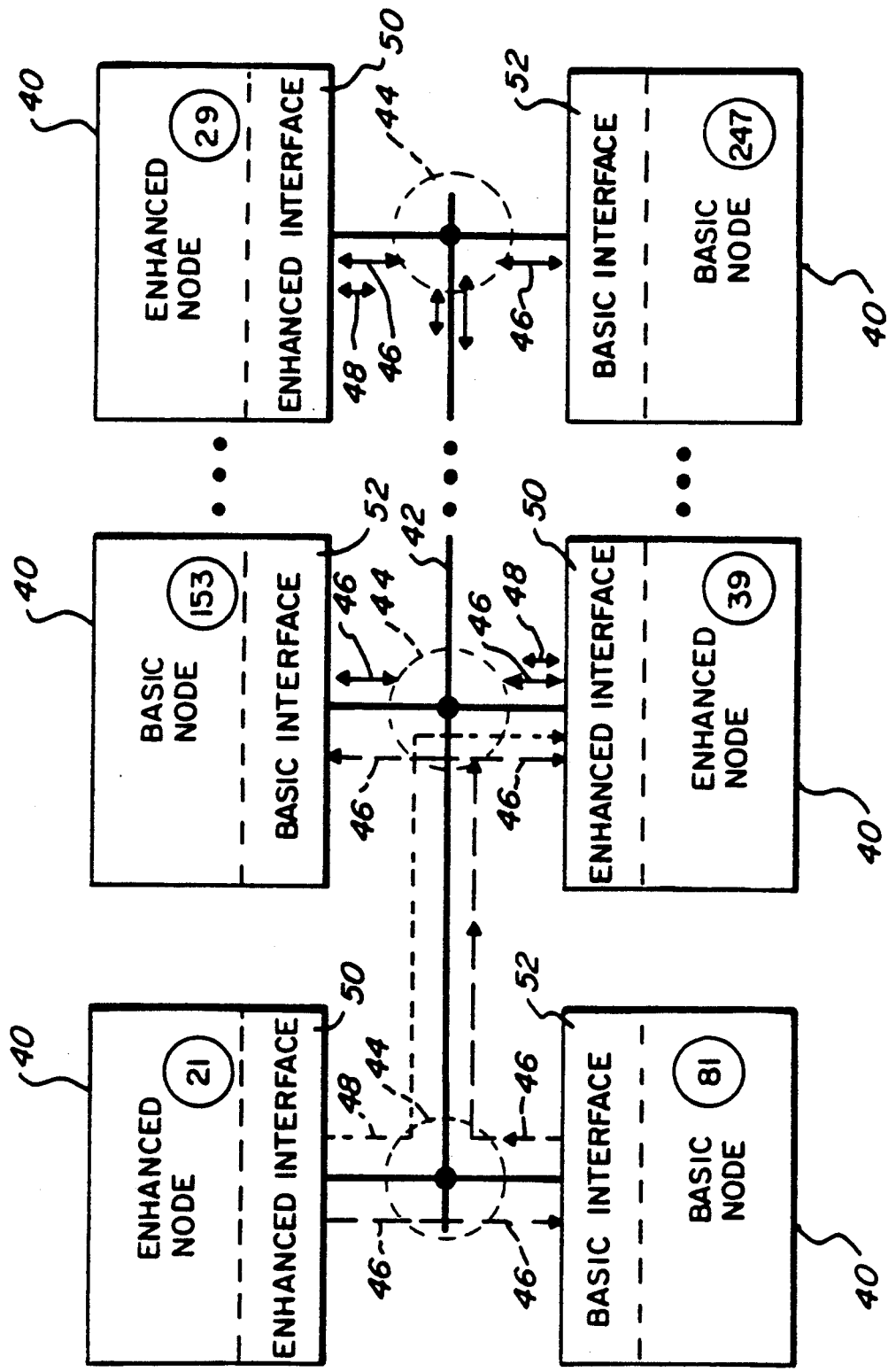
Fig_1

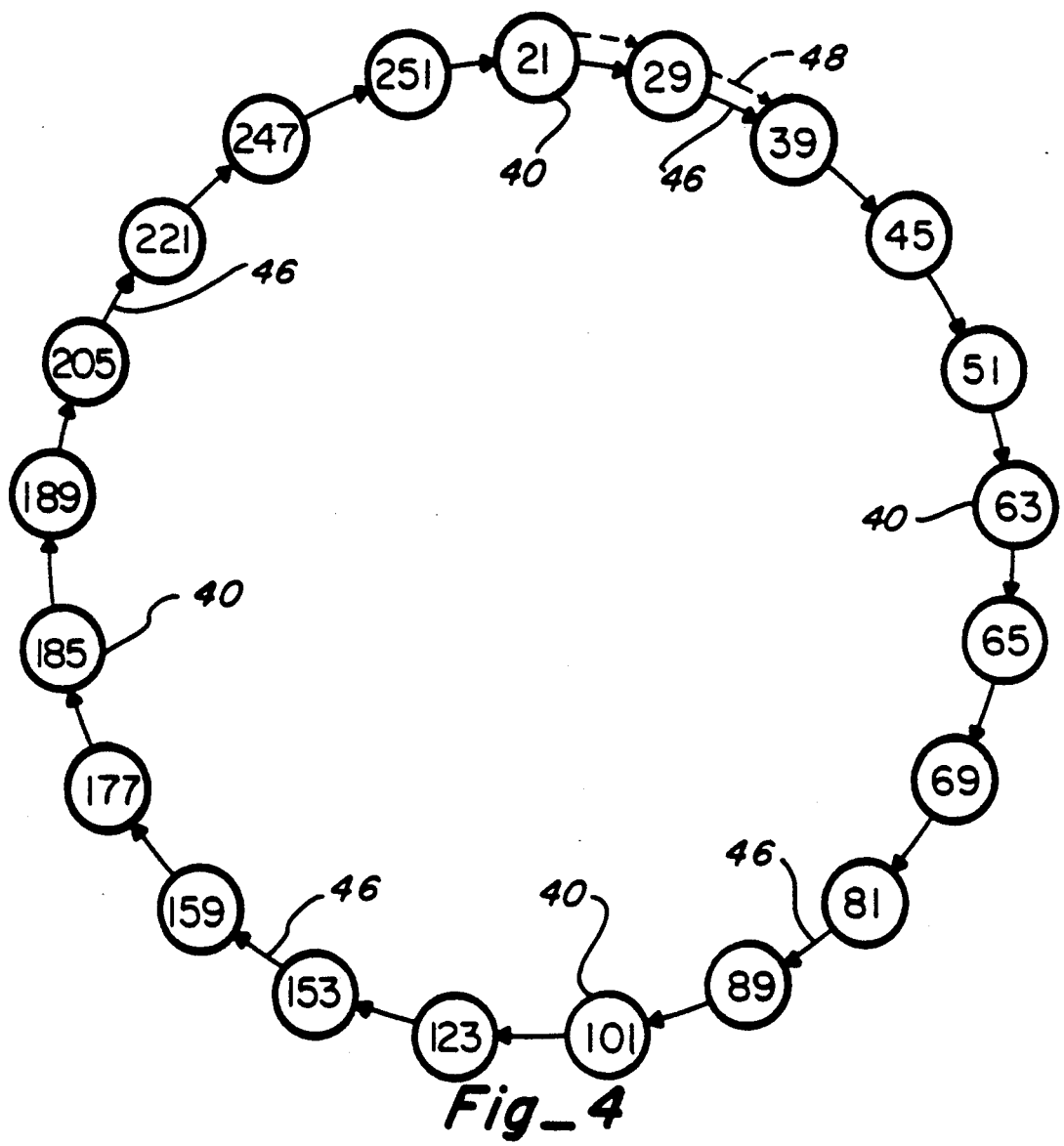
Fig_4
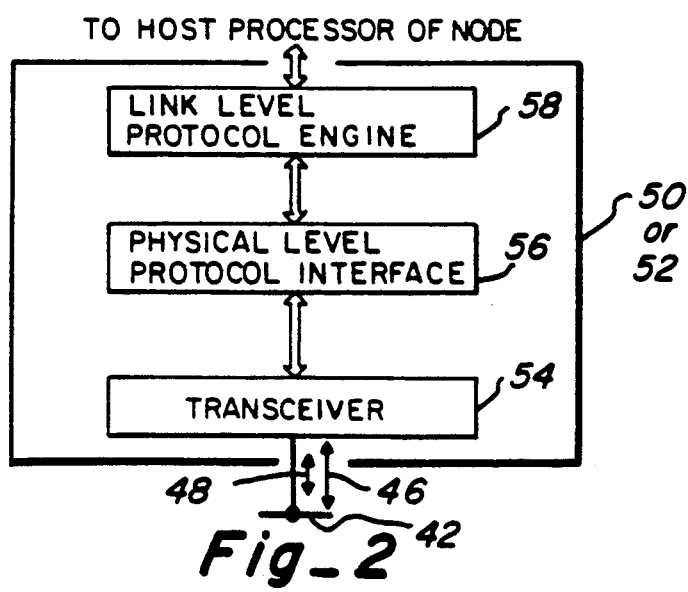
Fig_2

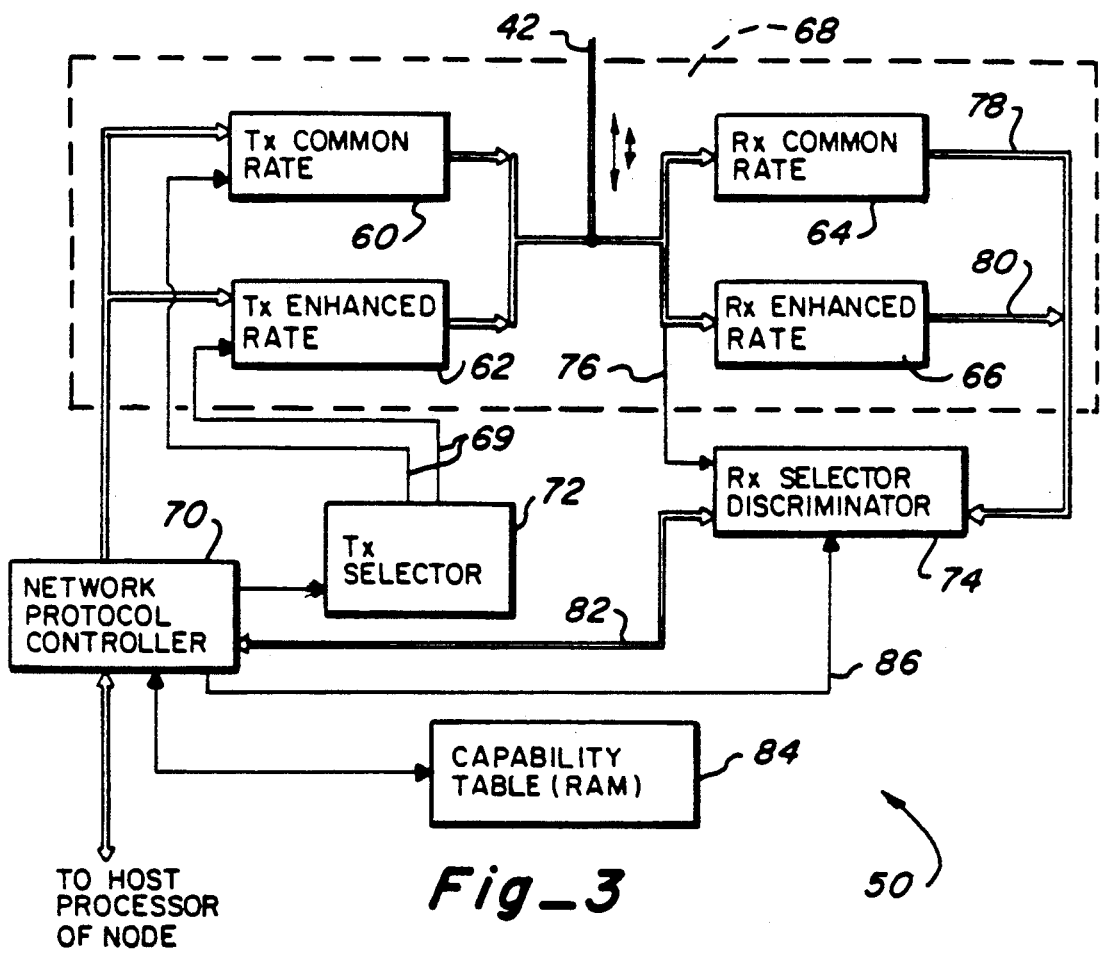
Fig_3

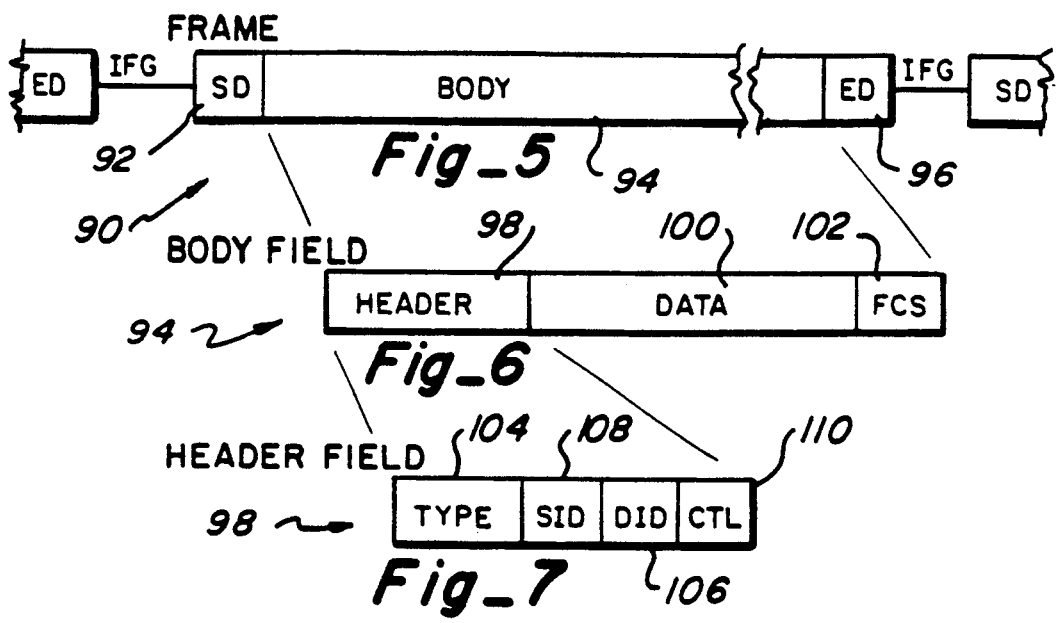
Fig_5
Fig_6
Fig_7
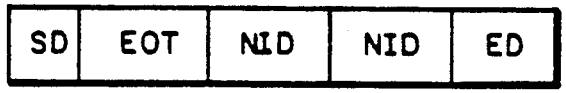
Fig_11
Fig_12
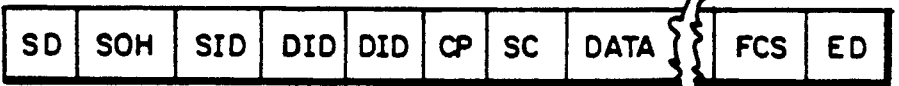
Fig_13
Fig_14
Fig_15

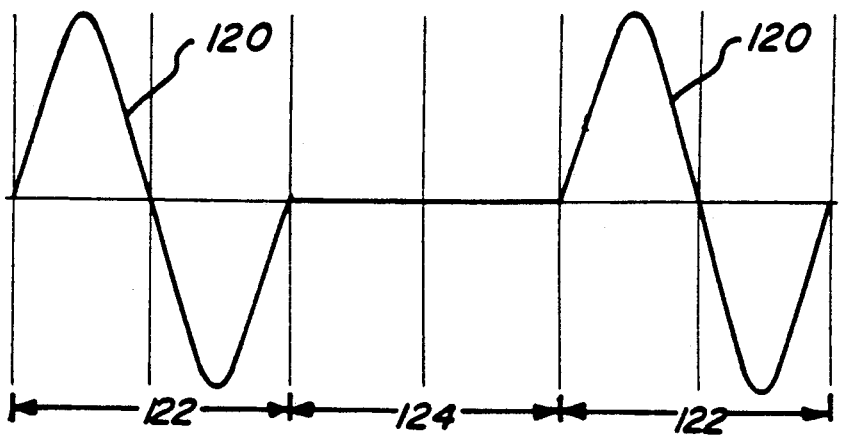
Fig_8
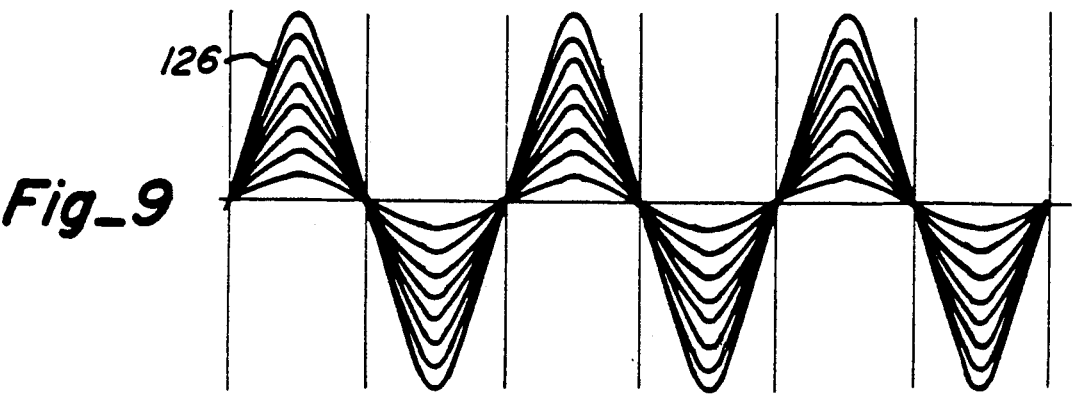
Fig_9
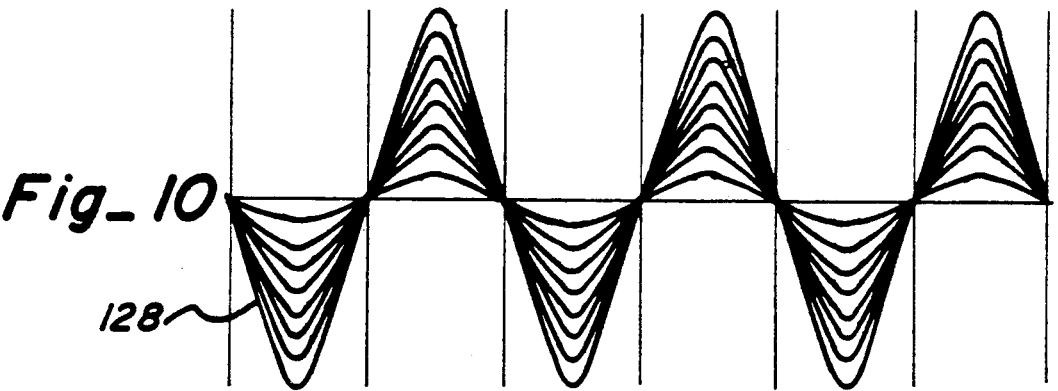
Fig_10

TOKEN TO BASIC NODE (XITT)
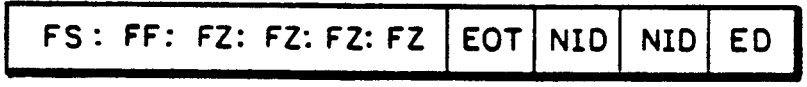
*Fig_16*
TOKEN TO ENHANCED NODE (XTOK)
*Fig_17*
INQUIRY TO ENHANCED NODE (XENQ)
*Fig_18*
RESPONSE TO ENHANCED NODE (XRSP)
*Fig_19*
DATA PACKET TO ENHANCED NODE (XPAC)
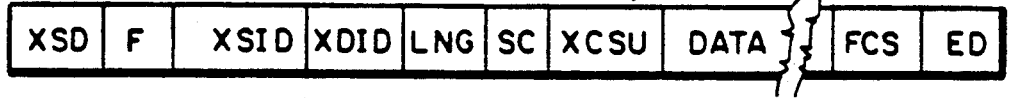
*Fig_20*

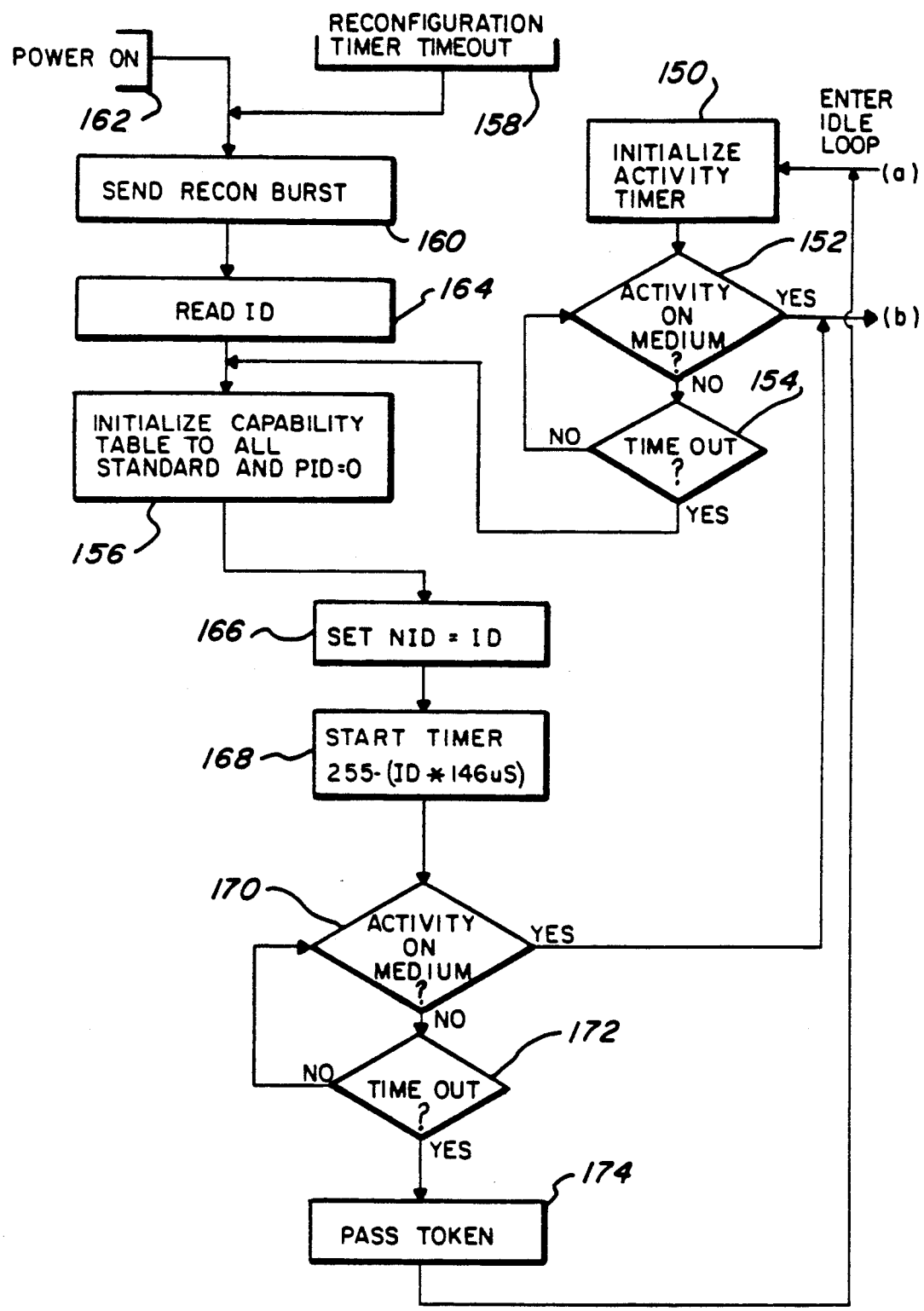
Fig_21A

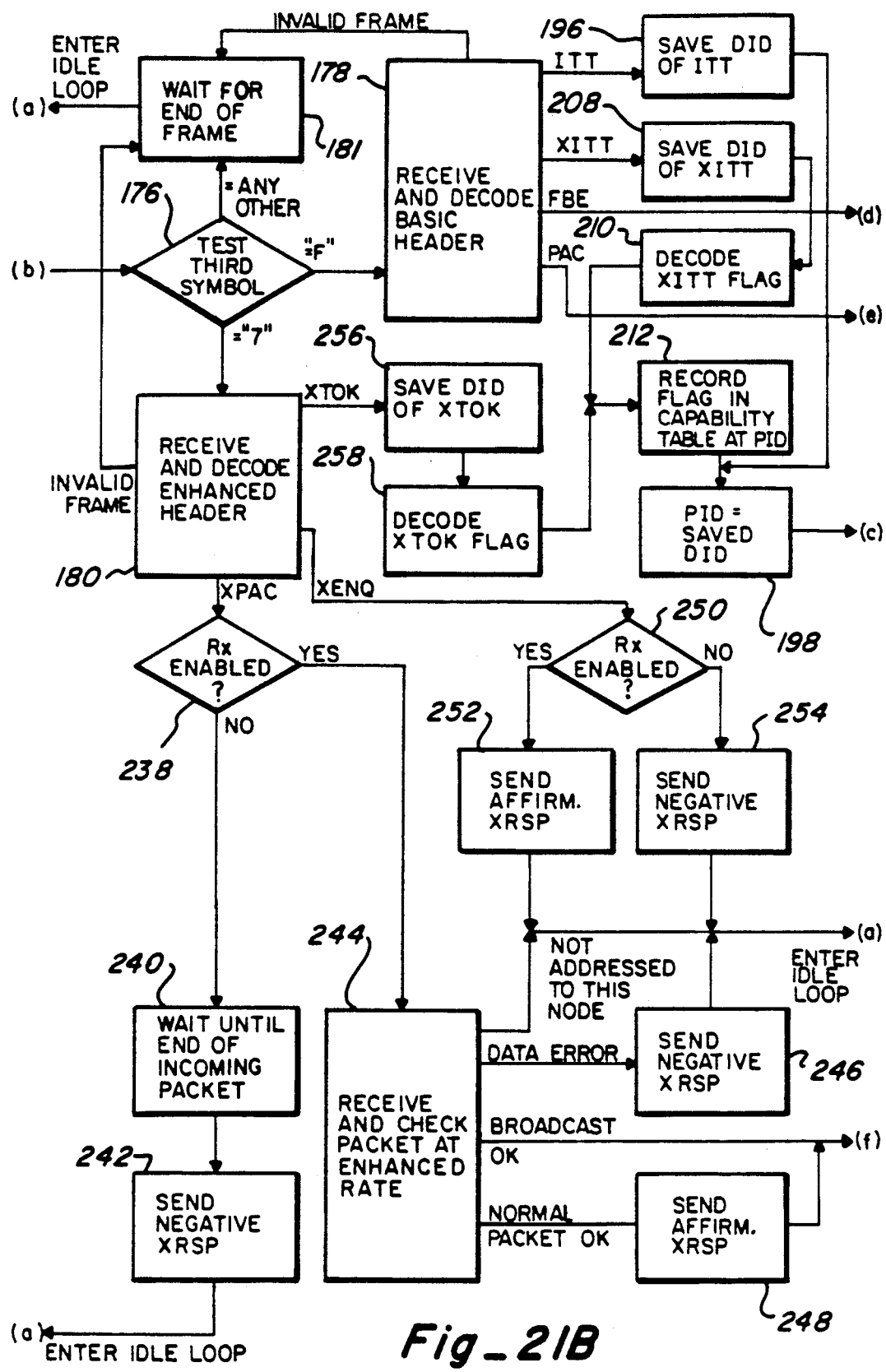
Fig_21B

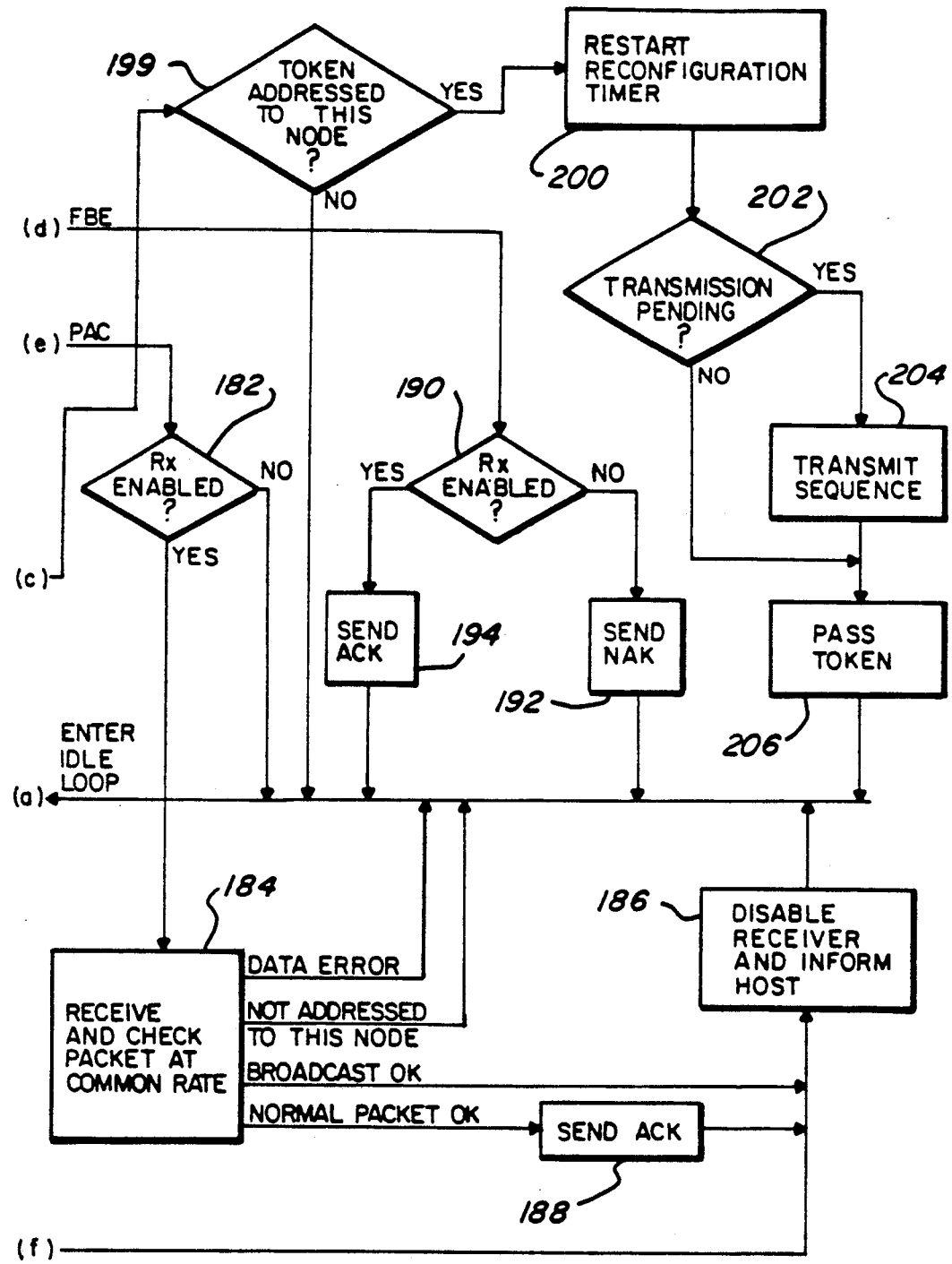
Fig_21C

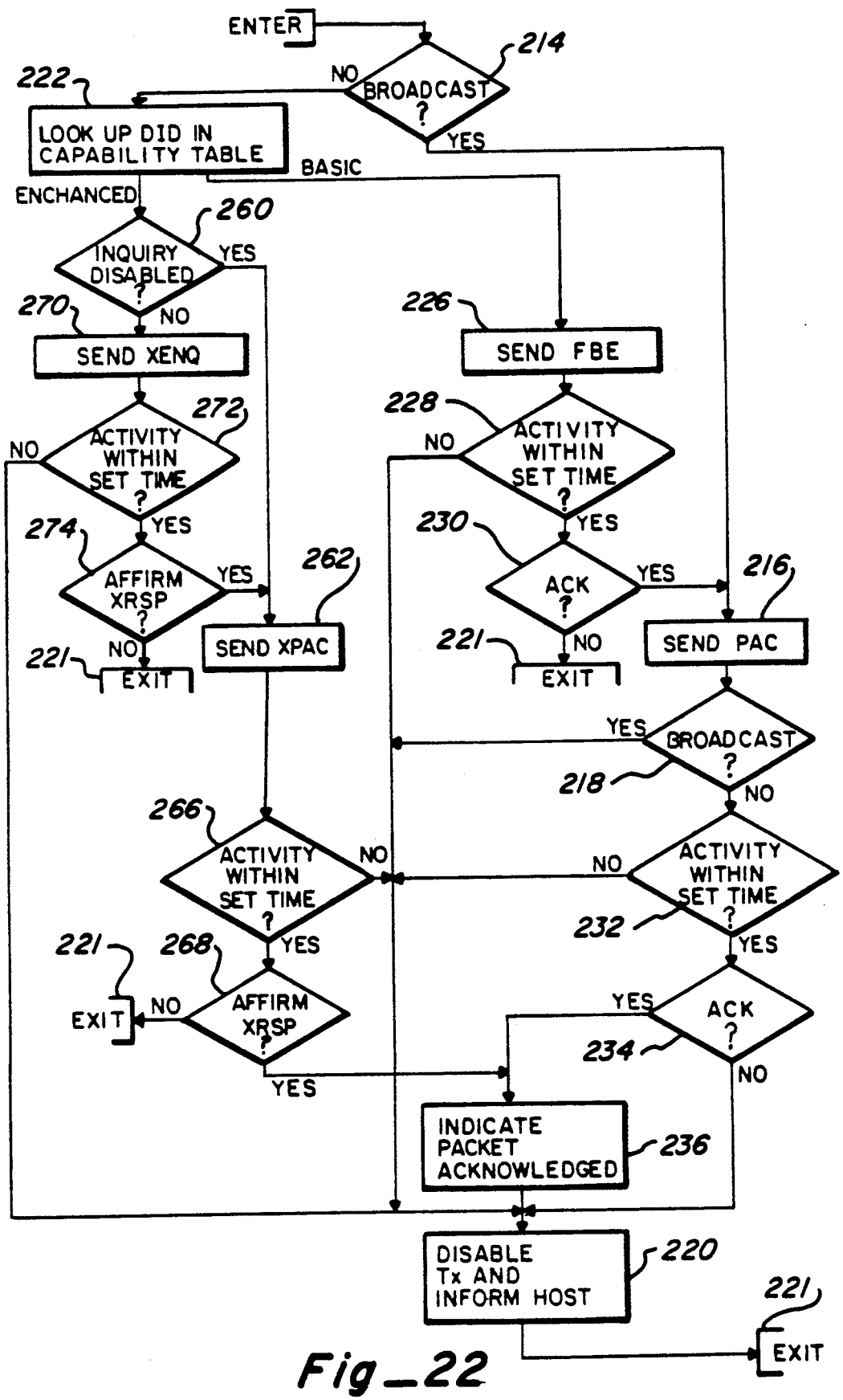
Fig_22

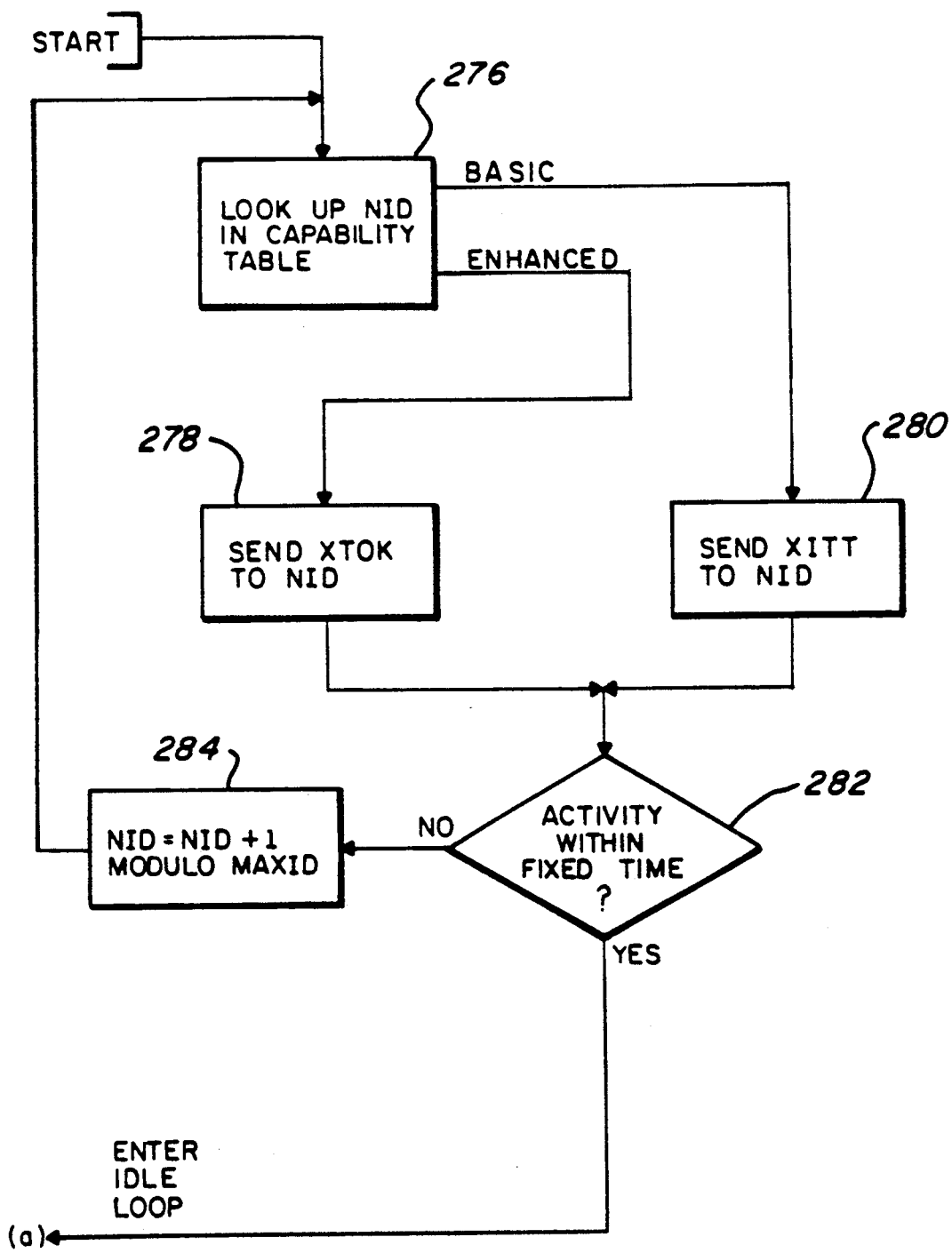
Fig_23

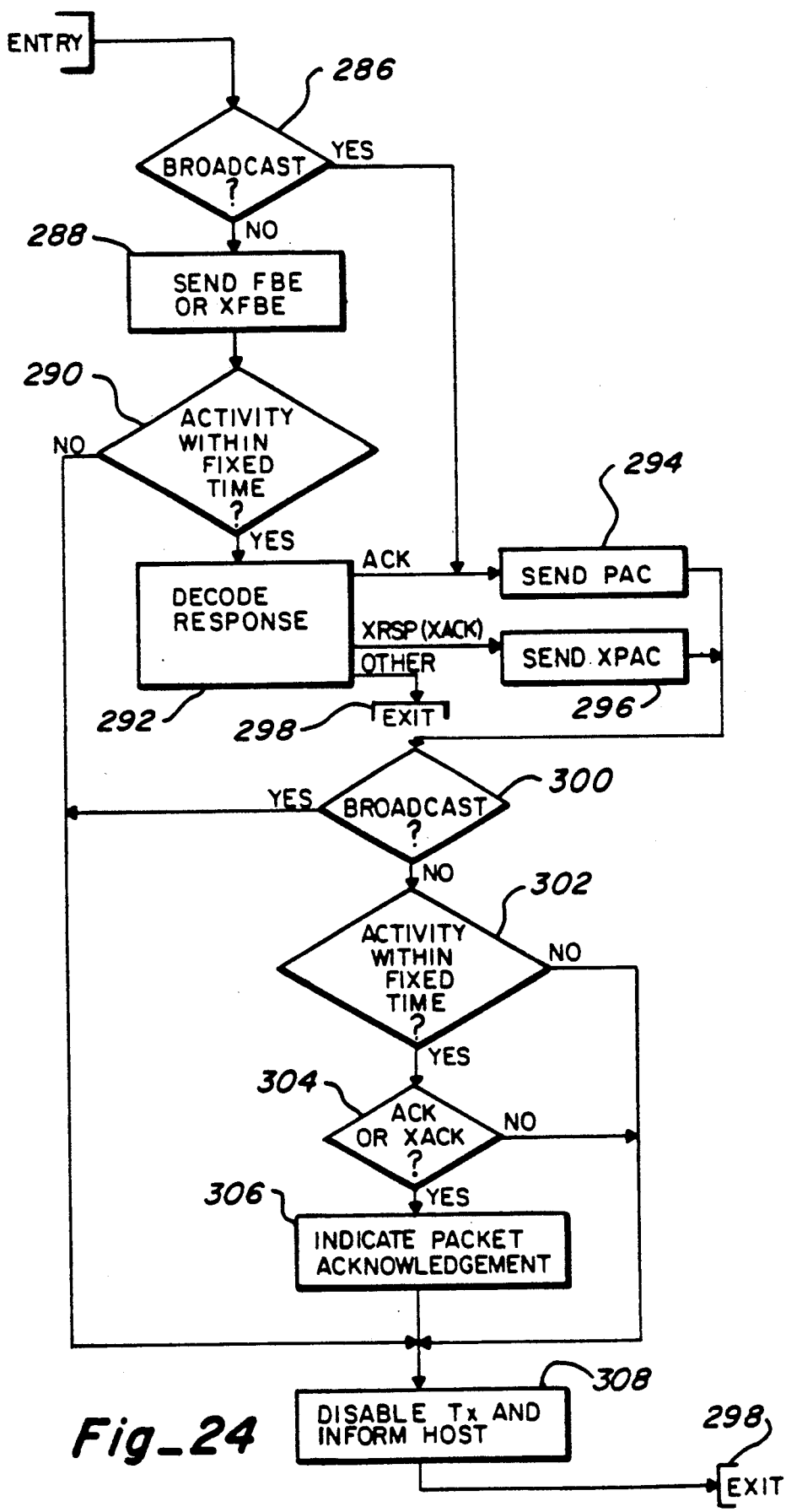
Fig_24

LAN WITH INTEROPERATIVE MULTIPLE OPERATIONAL CAPABILITIES

This invention relates to a local area network (LAN), and more particularly to an improved LAN which interoperatively combines at least one additional enhanced operational capability, for example an enhanced data transfer rate, with its usual or common operational capability.

CROSS-REFERENCE TO RELATED APPLICATIONS

The disclosures of two additional United States patent applications, filed concurrently herewith and assigned to the assignee hereof, relate to this application LAN WITH DYNAMICALLY SELECTABLE OPERATIONAL CAPABILITIES, Ser. No. 270,804, and MULTIBIT AMPLITUDE AND PHASE MODULATION TRANSCEIVER FOR LAN, Serial No. 270,739. The disclosures of these co-filed applications are incorporated herein by this reference.

BACKGROUND OF THE INVENTION

Recently LANs have taken on added significance in the field of computer systems. Current advancements point to the desirability of interconnecting computers on an organization-wide basis to obtain more overall distributed computing capacity. LANs are the means by which computers are typically interconnected on an effective basis for this purpose.

As the computing capacities of computers have continued to increase, the data transfer capacities of LANs have remained more or less the same for the past few years. This is because each LAN has its own predetermined operational protocol, and that protocol tends to be the limiting factor on the maximum amount of data which can be transferred. Since adhering to this operational protocol is critical to the proper operation of a LAN, and because the protocol tends to be fixed as an unalterable part of the design implementation of a LAN, improvements in LAN capability have centered more around efficiency in the software which delivers data to and receives data from the LAN, but not in the operating capability of the LAN itself. Such software improvements have generally not resulted in substantially enhanced LAN capacities.

LANs of different operational capabilities are available. However, LANs of high capabilities have tended to require special equipment, are significantly expensive, and have usually been implemented for special purposes rather than common use. The less expensive, more commonplace LANs have tended to have only moderate or low data transfer capacities. While the more commonplace LANs are satisfactory for some purposes, they can easily become a significant overall limitation in networking computers together to achieve system-wide, increased computing capacity.

In many network situations the use of a high capacity, more expensive, special purpose LAN cannot be justified from an overall standpoint. While high capacity devices such as high performance work stations, computational accelerators and file servers can utilize the higher LAN capacity, the number of high capacity devices on the network may be small compared to the number of relatively low capacity devices. The low capacity devices will generally have no need to utilize the higher capacity of a special purpose LAN. Significant expense will be encountered to establish a high capacity network for all of the devices, particularly when a pre-existing network must be replaced. However, failure to do so can result in a significant limitation in overall system-wide capacity, because the operational throughput of the relatively small number of high capacity devices is limited by the capacity of the LAN.

SUMMARY OF THE INVENTION

In accordance with its basic feature, the present invention interoperatively and compatibly incorporates on a single LAN, multiple different operational capabilities, such as data rates and communication protocols These multiple different operational capabilities are available at certain enhanced nodes on the LAN. A node includes not only the device which is connected to the LAN, but an interface means which receives the signals from the device and applies the signals to the LAN, and vice versa. A common operational capacity is preferably available at all of the nodes throughout the LAN, permitting communication between selected pairs of nodes. An additional enhanced operational capability is available at enhanced nodes. Enhanced nodes are established for those high performance devices which require the higher operating capability to efficiently communicate with other high performance devices. The common operational capability is used by the common or basic nodes with lower performance devices which are suitably serviced by the moderate or lower capability. Thus, the enhanced nodes need only be used for those small-in-number, but significant-in-functionality, high performance devices, while the basic nodes can be economically associated with those larger numbers of lower performance devices. Overall system capacity will thereby be enhanced in those segments of the LAN where enhanced performance is desired. Additional resources need not be committed to those segments of the LAN where moderate or lower performance capacity is acceptable.

Each enhanced node includes means for selecting either the common or an enhanced protocol for communicating with every other node. Typically the enhanced protocol will be selected for communication between enhanced nodes. The common protocol will be selected for communication with the basic nodes.

In accordance with the present invention, predetermined signals are applied by the nodes in compliance with a first and a second predetermined communication protocol to communicate information between nodes of the LAN. The signals applied in both the first and second protocols create the appearance of network activity in both protocols, and always communicate at least some apparently valid signal elements in one of the protocols, preferably the first or common protocol, and selectively communicate additional apparently valid signal elements in the other protocol, the second or enhanced protocol. The signals selected for both protocols are compatible with the network media and with the transceivers at both basic and enhanced nodes. The common protocol offers full interoperability. The enhanced protocol, preferably, shares some signal elements with the common protocol, but is only able to be fully interpreted by enhanced nodes. Preferably, some of the signal elements in the enhanced protocol are transparent to the common protocol and thus form a basis for inserting additional capability information in common communications. The capability information may include the rate and status capabilities of each enhanced node to communicate with the enhanced protocol. The capability information may be inserted in a token which is passed among the active nodes in a token passing network. Alternatively, the capability information may also be inserted into inquiries and responses communicated in the common protocol.

By use of the capability information, the enhanced nodes may selectively communicate with other enhanced nodes using the enhanced protocol, and communicate with the other nodes using the common protocol. The capability information may be used by either an enhanced source node of a communication or an enhanced destination node of a communication to select the communication rate. The use of inquiries and responses prior to sending a data packet may also be optional based on the capability information previously communicated. Tokens may be passed between enhanced nodes at an enhanced rate. Many other improvements may also be incorporated in the second protocol as compared to the first protocol.

The present invention can be better understood by reference to the following detailed description taken in conjunction with the accompanying drawings which are briefly described below. Of course, the actual scope of the invention is defined by the appended claims.

BRIEF DESCRIPTION OF THE DRAWINGS

FIG. 1 is an illustration of a bus-type LAN in which the present invention is incorporated, having multiple nodes, including enhanced nodes and basic nodes, connected by a network communication medium.

FIG. 2 is a generalized block diagram of an interface of a basic or enhanced node of the LAN shown in FIG. 1.

FIG. 3 is a block diagram of an enhanced interface of an enhanced node which is capable of operating at a plurality of different rates when communicating with other nodes of the LAN shown in FIG. 1.

FIG. 4 is an illustration of a logical loop of the sequence in which a token is passed among the nodes of a token-passing LAN, such as is represented in FIG. 1.

FIG. 5 is a general illustration of a frame which is communicated between the interfaces shown in FIGS. 2 and 3.

FIG. 6 is an expanded illustration of a body field of the frame shown in FIG. 5.

FIG. 7 is an expanded illustration of a header field of the body field shown in FIG. 6.

FIG. 8 is a generalized illustration of a basic analog signal waveform which is transmitted and received by each basic interface shown in FIG. 1, which signifies a one-bit value in a common or basic operational protocol FIG. 9 is an illustration of multiple, different-amplitude, analog signal waveforms which commence with a positive half cycle and end with a negative half cycle, which are transmitted and received by the enhanced interfaces shown in FIG. 3, illustrated on the same time reference axis as that shown in FIG. 8.

FIG. 10 is an illustration of multiple, different-amplitude, analog signal waveforms which commence with a negative half cycle and end with a positive half cycle, which are transmitted and received by the enhanced interfaces shown in FIG. 3, illustrated on the same time reference axis as that shown in FIGS. 9 and 10.

FIG. 11 is an illustration of a basic frame known as a token (ITT), which is commonly communicated by each interface of the LAN shown in FIG. 1.

FIG. 12 is an illustration of a basic frame known as a free buffer inquiry (FBE), which is commonly communicated by each interface of the LAN shown in FIG. 1.

FIG. 13 is an illustration of a basic frame known as a data packet (PAC), which is commonly communicated by each interface of the LAN shown in FIG. 1.

FIG. 14 is an illustration of a basic frame known as an acknowledgement (ACK), which is commonly communicated by each interface of the LAN shown in FIG. 1.

FIG. 15 is an illustration of a basic frame known as a negative acknowledgement (NAK), which is commonly communicated by each interface of the LAN shown in FIG. 1.

FIG. 16 is an illustration of an enhanced frame known as an enhanced token (XITT), which is communicated by the enhanced interfaces of the LAN shown in FIG. 1.

FIG. 17 is an illustration of an enhanced frame known as a speed token (XTOK), which is communicated by the enhanced interfaces of the LAN shown in FIG. 1.

FIG. 18 is an illustration of an enhanced frame known as an enhanced inquiry (XENQ), which is communicated by the enhanced interfaces of the LAN shown in FIG. 1.

FIG. 19 is an illustration of an enhanced frame known as an enhanced response (XRSP), which is communicated by the enhanced interfaces of the LAN shown in FIG. 1.

FIG. 20 is an illustration of an enhanced frame known as an enhanced data packet (XPAC), which is communicated by the enhanced interfaces of the LAN shown in FIG. 1.

FIGS. 21A, 21B and 21C form a flow chart illustrating the operation of the enhanced interface of the LAN shown in FIGS. 1 and 3.

FIG. 22 is a flow chart illustrating in greater detail a transmit sequence portion of the flow chart shown in FIGS. 21A and 21C.

FIG. 23 is a flow chart illustrating in greater detail a token passing portion of the flow chart shown in FIG. 21B, used when passing an enhanced token (XITT) or a speed token (XTOK).

FIG. 24 is a flow chart illustrating in greater detail a portion of the flow chart shown in FIG. 21C illustrating another embodiment of the invention where rate and capability information can be established by communicating basic or enhanced inquiries and basic or enhanced responses on a packet by packet basis.

DETAILED DESCRIPTION

The present invention applies to a local area network (LAN or "network") such as that shown in FIG. 1. The LAN comprises a plurality of nodes 40 which are all commonly interconnected to a communication medium 42. The communication medium 42 includes means by which signals are transmitted between the nodes 40. The communication medium may take the form of a plurality of interconnected signal communication links, such as coaxial cables, twisted cable pairs, optical links, radio links, or combinations of these and others. Although only six representative nodes 40 are illustrated in FIG. 1, it is not unusual for a single LAN to have hundreds of nodes 40 connected to a single medium 42.

The LAN illustrated in FIG. 1 is a bus-type LAN, meaning that all of the nodes 40 are connected to a single logical point (the medium 42) and logically in parallel with one another. An essential characteristic of a bus-type LAN is that each transmission by any node is transmitted directly for receipt by all of the other nodes. Typically, the nodes are connected through connecting point devices known as hubs 44. A hub 44 is a means by which a plurality of signal communication links can be connected together, thus connecting all the communication links to a single common logical point, the medium 42. Hubs facilitate cable management, signal amplification and/or fault isolation. Hubs neither interpret nor modify LAN communications. Each node of a bus-type LAN may directly address and communicate with other nodes through the single logical point.

Each node 40 of the LAN has its own unique network address, known as an identification (ID). This address or ID is assigned to the node at the time the node is physically connected to the LAN medium 42. The numbers enclosed within circles in the nodes 40 shown in FIG. 1 are representative examples of network addresses.

The nodes 40 communicate with each other by utilizing the IDs in the "frames" of data which form each transmission. The node which initiates the communication, hereinafter referred to as a "source" node, includes the ID of the node to which the transmission is destined when it transmits over the medium 42. The node to which the communication is destined is hereinafter referred to as a "destination" node. Since all of the other nodes on the LAN also receive the signals transmitted by the source node, the address of the destination node (DID), is utilized by each node on the network to recognize and accept only those transmissions addressed to it, while discarding or not recognizing the other transmissions not addressed to it. In addition, since some communications over the network involve multiple transmissions of signals between the source and destination nodes, the source node also frequently includes its own address (SID) in transmissions so the destination node can utilize that address when replying. Broadcasts, which are received by all nodes, and multicasts which are received by predefined groups of nodes, are also made possible by this addressing technique.

One well known, token-passing, bus-type LAN is that manufactured and sold by the assignee hereof under its United States registered trademark ARCNET. An extensive amount of information has been published on the ARCNET LAN, both by the assignee of the present invention and by others. Components to implement the ARCNET LAN are commercially available from sources including the assignee and others. One source of information concerning the ARCNET LAN is the *ARCNET Designer's Handbook* published by Datapoint Corporation, San Antonio, Tex., copyright 1983. The interoperability aspects of this invention are compatible with the ARCNET LAN.

Two different types of nodes 40 are present on the LAN in accordance with the present invention. As is shown in FIG. 1, basic nodes at IDs 81, 153 and 247 and enhanced nodes at IDs 21, 29 and 39, are both connected in the LAN. The basic nodes have only a single common operational capability, and therefore always operate in accordance with this common operational capability. The enhanced nodes have multiple different operational capabilities. One of the multiple operational capabilities available from each enhanced node is the common operational capability also present in each basic node. Thus, both the enhanced and the basic nodes have one common operational capability which may be used for communication. At least one of the multiple operational capabilities of each enhanced node is an enhanced operational capability which is substantially different than the common operational capability. Furthermore, in accordance with the present invention, the enhanced nodes of the LAN are capable of dynamically selecting among themselves which of the operational capabilities to employ in communicating with another enhanced node and with a basic node. The common operational capabilities of each basic node remain unaffected by the presence of the enhanced nodes, thus preserving the basic operational capability of the LAN and avoiding the necessity to replace the whole LAN to obtain enhanced communication capabilities between a limited number of high performance nodes, i.e. the enhanced nodes.

The common and enhanced operational capabilities of the basic and enhanced nodes of the LAN are illustrated by the dash lines 46 and 48 shown in FIG. 1. The longer dash lines 46 represent the common operational capability. The enhanced node ID 21 may communicate at the common operational capability with the basic node ID 81. Similarly, the basic node ID 81 can communicate only at the common operational capability with another basic node ID 153 and with an enhanced node ID 39. The shorter dash lines 48 illustrate an enhanced operational capability which is used only by the enhanced nodes. The enhanced node ID 21 may communicate only with the other enhanced nodes, e.g. ID 39, at the enhanced capability. Of course, the network medium 42 carries the signals representative of either type of operational capability with equal facility. As is represented by the longer dash lines 46 and the shorter dash lines 48, the enhanced nodes can communicate at both operational capabilities, while the basic nodes can communicate only with the common operational capability.

Operational capability as used herein may refer to a variety of substantially different operational functionalities. Examples of multiple different operational capabilities contemplated by the present invention are different communication protocols and different data transfer rates between the nodes. As an example, but not to be used to construe the extent of the difference in operational capabilities, the common data transfer rate may be at 2.5 million bits per second, while the enhanced data rate transfer capability may be 20 million bits per second. Another example of an enhanced communication protocol is the optional use of inquiries and responses prior to the communication of a data packet.

Each node includes an interface 50 or 52 by which signals are applied to and received from the medium 42. Enhanced nodes include enhanced interfaces 50, while the basic nodes include basic interfaces 52. Each node, whether enhanced or basic, also includes a host computer or processor (not shown) which performs various data processing functions, or a controller performing various data transfer functions. For example, a node may include a personal computer, work station, a network server computer, or network connected I/O device, interface, sensor or actuator, or the like, which transmits and receives data over the medium 42. The function of the interfaces 50 and 52 is to send the data over the medium, to receive the data from the medium, to receive the data to be sent on the medium from the host processor, and apply the data received from the medium to the host processor, so that the host processor can function in an efficient and reliable manner. Because each node includes an interface 50 or 52, the functionality of the interfaces is distributed throughout all of the nodes of the LAN.

The basic components of a typical interface 50 or 52 are illustrated in FIG. 2. A conventional transceiver 54 applies the electrical, optical or other physical signals to the medium 42 and receives the signals from the medium 42. A physical level protocol interface 56 receives electrical signals from the transceiver 54 and applies electrical signals to the transceiver 54. The signals transmitted on the medium 42 are in bit serial form. One of the functions of the physical level protocol interface 56 is to convert the bit serial data stream into a parallel bit data stream for use by the other elements of the node, and to convert the parallel bit data stream from the other elements of the node into a bit serial data stream. The term "physical level" used in reference to the interface 56 is the well known physical layer in the seven layer reference model for network communications. The physical level or layer is responsible for interfacing with the medium 42, detecting and generating signals on the medium, and converting and processing the signals received from the medium. In very general terms, the physical layer concerns the general encoding of network data into waveforms which will travel on the medium, and decoding those waveforms when received. The physical level protocol interface 56 and the transceiver 54 achieve these functions.

Each interface 50 or 52 also includes a link level protocol engine 58. "Link level" again refers to the standard seven layer reference model for networks, and generally relates to the sending and receiving of frames of data over the medium 42 and controlling access to the medium 42. Frames of data, as will be discussed below, relate to groupings of various physical level signals in such a way to achieve the desired network functionality. For example, all the functions involved in sending and receiving frames, including inserting starting delimiters, ending delimiters, and stripping these off once the data is received, are link level functions. Other link level functions are control of access to the medium and the handling of affirmative and negative acknowledgements. The link level protocol engine 58 controls and achieves the type of functionality to which this invention primarily relates. The higher levels of communication in the seven layer model are generally handled by the host or I/O processor of the node. Even though it is preferred to implement the functionality of the interfaces in a distributed manner in each node, some of this functionality, for example media access control, can be implemented on a centralized basis, as is known.

More reliable network interfaces generally provide a separate link level protocol engine, generally implemented as a microsequencer operating from firmware. However, many of the link level functions could also be achieved by the host processor. Generally speaking the advantages of providing a separate link level engine 58 are that its functionality is generally independent from the host processor, and therefore offers more reliability and interoperability in LAN functionality. The functionality of the link level protocol engine 58 in the common capacity of operation is identical in all nodes, and its functionality is isolated and secure against possible malfunctions in the host software or hardware. A second reason for providing a separate link level protocol engine 58 is that the time dependent aspects of the operation of the host processor are isolated from the time dependent aspects of data communication over the LAN. Use of the separate link level protocol engine 58 avoids sporadic timing problems between the host processor and the signals on the LAN. Lastly, the use of the separate link level protocol engine 58 allows some of the functionality from the host processor to be offloaded, thereby increasing the productivity of the host processor.

The basic interfaces 52 for the ARCNET LAN, are commercially available from a wide variety of sources, and are known as resource interface modules (RIMs). The link level engine 58 which is used on the ARCNET LAN is commercially available as an integrated circuit designated COM90C26 from Standard Microsystems Corporation and 90C26 from NCR Corporation. The physical level interface 56 used on the ARCNET LAN is commercially available as an integrated circuit designated COM90C32 from Standard Microsystems Corporation and 90C32 from NCR Corporation.

An example of an enhanced interface 50 is shown in FIG. 3. As has been previously noted, the common and enhanced operational capabilities selected for illustration of the present invention are different data communication rates. Accordingly, the enhanced interface 50 includes a common rate transmitter 60 and an enhanced rate transmitter 62, each of which operates at a different data rate. The transmitters are commonly connected to the network medium 42. A common rate receiver 64 and an enhanced rate receiver 66 are also included in the interface 50. These receivers commonly receive signals from the network medium 42. The common rate transmitter 60, and the common rate receiver 64 operate at the common data rate. Therefore, the enhanced interface 50 will always be able to transmit and receive at the common data rate. The enhanced transmitter 62 and the enhanced receiver 66 have a substantially different data rate communication capability, compared to the common rate. The data rate capabilities of the enhanced transmitter 62 and the enhanced receiver 66 are preferably the same in all of the enhanced nodes.

The various transmitters and receivers illustrated in the enhanced node 50 may actually be separate items, as indicated in FIG. 3, or may be integrated into a single device 68. One example of a single transceiver capable of communicating at common and enhanced data rates is disclosed in the concurrently filed application for MULTIBIT AMPLITUDE AND PHASE MODULATION TRANSCEIVER FOR LAN.

Each enhanced node 50 also includes a network protocol controller 70. In a typical case, the network protocol controller 70 will control all of the physical and link level protocol functionality, leaving the network, transport and other higher levels of network functionality to the host processor of the node. The network protocol controller 70 is the preferred means for achieving the physical and link level functionality described herein. The protocol controller 70 controls a transmitter selector 72 which in turn supplies control signals at 69 to the transmitters 60 and 62 to activate the selected transmitter. Data from the host computer is converted by the protocol controller 70 into the appropriate frame format for both the common and enhanced operational capabilities. The protocol controller assures that all transmissions are in accordance with the established protocols for the selected operational capability. Media access is also controlled by the protocol controller 70.

The enhanced interface 50 also includes a receiver selector-discriminator 74. Signals from the network medium 42 are preferably applied as control signals at 76 to the selector-discriminator 74. In the majority of cases, the signals supplied over the medium 42 will unambiguously identify the rate and protocol at which those signals are transmitted. The physical characteristics or signal elements of the signals may distinguish the data rates from one another. The signals form a control signal at 76 which allows the selector-discriminator 74 to select one of the data paths 78 and 80 from the receivers 64 and 66, respectively, which will be coupled through the selector-discriminator 74 over the data path 82 to the network protocol controller 70. Of course, the network protocol controller 70 removes the various link and physical level control information from the signals in the data path 82, and supplies those remaining signals to the host processor of the node. The selector-discriminator 74 discriminates among the various data rates present on the medium 42, and selects the appropriate receiver which supplies the data to the network protocol controller 74.

A capability table 84 is also connected to the protocol controller 70, in the enhanced interface 50. The capability table is a random access memory (RAM) in which information is recorded regarding the capabilities and status of other nodes on the network. This information is made available to the protocol controller 70 for use in selecting the transmitters and receivers for communication. The capability information is recorded in the table 84 in association with the ID of each node, as is discussed more completely below.

In addition to controlling the selection of one transmitter, the data in the capability table 84 may also be used by the protocol controller 70 to supply a control signal at 86 to the receiver selector-discriminator 74 for selecting the appropriate one of the receivers to receive transmissions. The control signal at 86 is used by the selector-discriminator 74 when the characteristics of the raw signals applied at 76 are insufficient to discriminate between multiple different data rates on the medium 42. Under such circumstances, the protocol controller 70 would obtain information, either from the host processor, the capability table 84 or from other sources disclosed below, that transmissions from a particular other node would be arriving at a particular rate. Under those circumstances, the signal at 86 would select the appropriate receiver to apply output signals over the data path 82 to the protocol controller 70.

The capability table 84 may not be needed in practicing all embodiments of the invention. As described below and in the co-filed application LAN WITH DYNAMICALLY SELECTABLE MULTIPLE OPERATIONAL CAPABILITIES, there is a technique for dynamically selecting the data rate and protocol as a part of communication between nodes. In such circumstances the rate information would be included as a part of the communication, and the selection would be made by the protocol controller 70 immediately before transmitting the data. A further alternative is to pre-assign capability information to a particular range of node IDs, and to thereafter set the ID of each enhanced node within the pre-assigned range in accordance with the capability of the node.

Based on the information previously recorded in the capability table 84 or otherwise obtained, the source node will generally transmit at the highest data rate that the destination node is capable of receiving. However, it should also be recognized that a destination node and source node could dynamically negotiate or establish a data rate on a communication by communication basis which is less than their maximum capability if such circumstances are appropriate. Examples of such circumstances might be where open-air optical or radio communication links are included in the medium 42 and atmospheric or other environmental influences have degraded the integrity of the communication link to a point where the high data rate is more likely to result in an unacceptable amount of transmission errors.

The network protocol controller 70 is preferably implemented by a microsequencer operating from firmware. Alternatively, the majority of the functions of the network protocol controller 70 could also be implemented on the software of the host computer of the node, but for the reasons previously mentioned, including reliability, compatibility and economical implementation, a separate network protocol controller 70 is preferred. Details of the functions preferably provided by the network protocol controller 70 in detail below.

In token passing LANs, it is typical that the functionality for passing the token is distributed to each of the node interfaces 50 and 52 (FIG. 1). In addition to its own ID, the ID of the next active node in the rotational sequence of token passing is also maintained in each node interface 50 and 52. An active node is one which is currently able to participate in network communication but which may or may not have messages to communicate. Inactive nodes, that is those nodes which are not functioning at that time and are therefore not able to participate in network communication, are eliminated from the token passing rotational sequence. Only the active nodes participate in token passing. This avoids wasting time attempting to pass the token to inactive nodes.

Upon receipt of the token, the node initiates a message communication if it has a message to communicate. At the conclusion of the message communication, or if no message communication is to be initiated, the token is passed to the next active node in the rotational sequence. In this manner, the token is passed from active node to active node in an even rotational sequence or token passing loop, as is illustrated by FIG. 4. FIG. 4 illustrates only the sequence of token passing, and not the physical data routing or interconnection pattern of the network.

The even rotational sequence of token passing is typically from an active node of a lesser network ID to the active node at the next higher network ID. When the token reaches the active node of the highest ID, the token is passed to the active node of the lowest ID to commence the next token loop.

Each node stores the address (NID) of the next active node in the token loop. In this manner, each active node knows the next active node in the loop to which the token is to be passed. To establish the NID of the next active node for token passing purposes in all of the active nodes, a procedure called network reconfiguration occurs.

Network reconfiguration starts upon power-on of the network, whenever a new node becomes active on the network, or whenever any node has not received the token in a predetermined period of time. At the beginning of the network reconfiguration sequence, each interface initializes its NID to its own ID. A time-out procedure based on the assigned node ID at each interface is used to select the interface with the highest assigned ID, and that node commences sending a token. The first token sent is to an ID which is equal to its own assigned ID. After sending that token, the interface waits for activity on the medium. Such activity only occurs in the case where another node has received the token and is sending a message or passing the token itself. If no activity is sensed within a predetermined time, the interface increments the NID by one modulo the maximum allowable ID value (256 in the case of ARCNET), and repeats the process The process continues until the next active node is addressed by the token and responds to the token by creating network activity. At that point, the interface which sent the token successfully to the next active node senses the activity and establishes the correct NID value for that next active node. The interface of the active node which accepted the token repeats the procedure until it too establishes its NID by successfully passing the token. All of the interfaces of all of the nodes of the LAN function in a similar manner until the NID of each node is determined, which establishes the complete rotational sequence of the token passing loop of the active nodes.

Network reconfiguration can occur at any time to allow new active nodes to enter the token loop. When an interface is first powered on and when it has not received a token for a predetermined time period, it sends a reconfiguration burst. A reconfiguration burst is a signal which is longer than any other communication or frame so it interferes with any communication which is attempted or in progress. This interference prevents the successful passing of the token while appearing to all active nodes as network activity, thereby forcing network reconfiguration.

Another type of reconfiguration can occur to allow previously active but now inactive nodes to drop out of the rotational sequence. This reconfiguration does not involve network-wide reconfiguration. When an active node becomes inactive and drops out of the rotational sequence, the attempted token pass to the newly inactive node will result in no interface receiving the token. The node which unsuccessfully attempted to pass the token to the previously active but now inactive node will sense the lack of activity. After a predetermined time period, shorter than that time period before network reconfiguration occurs, the node which unsuccessfully attempted to pass the token will commence the activity of incrementing its NID and sending tokens until a token is successfully passed, as in a network reconfiguration previously explained. However, once the token is successfully passed the token loop is reestablished because all of the other nodes in the loop remain active and retain the NIDs they previously established during network reconfiguration. Thus, when a previously active but now inactive node drops out of the rotational sequence, only the preceding active node will establish a new NID, thereby saving some of the time required to create a network-wide reconfiguration.

While the foregoing discussion applies primarily to the ARCNET LAN, other types of reconfiguration techniques are available to establish a token passing pattern among the active nodes. The present invention is applicable to such other types of networks such as those described by the IEEE 802.4 standard Communication between nodes occurs by sending and receiving frames A frame is a series of signals applied to the medium. An example of a frame which is communicated by the enhanced and basic interfaces 50 and 52 (FIG. 1), respectively, is illustrated in FIG. 5. The frame, referenced 90, includes a starting delimiter (SD) field 92, a body field 94, and an ending delimiter (ED) field 96. Since each frame is in reality a serial stream of signals on the LAN medium, each frame is separated by an interframe gap (IFG) of silence or absence of signals on the medium. The duration of the interframe gap is usually established by fundamental physics and relates to the propagation delays created in part by the physical size of the network. The purpose of the interframe gap is to allow the medium to quiesce after signals have been applied to it, and to allow the transceiver circuitry to be made ready for the next frame. For most LANs, the interframe gap is at least equal to the physical settling time of the medium. The SD 92 is typically a fixed pattern of signals used to indicate that the frame is beginning and to provide the necessary synchronization or calibration information for the receiver at the destination node. The body field 94 can be variable in length. The ED 96 is a pattern of signals which is fixed in length and in content and serves to mark the end of the frame 90. The SD and ED are physical level protocol elements and are described in greater detail below.

The body field 94 can be further broken down as shown in FIG. 6. The body field 94 starts with a header field 98, progresses to a data field 100, and ends with a frame check sequence (FCS) field 102. The FCS field 102 will contain an error checking or, more advantageously, an error correcting code. The data field 100 may contain data, or in some frames, the data field 100 may not even be present. Similarly, the FCS field 102 may also be eliminated in some types of frames. The header field 98 and its contents and the FCS field 102 are normally link level protocol elements and are described in greater detail below.

The header field 98 is illustrated in greater detail in FIG. 7. The header field 98 is generally always present in frames and contains the information needed to identify the type of frame, as is represented by a type field 104, the ID of a destination node (DID) 106, the ID of the source node (SID) 108, and a field 110 which contains control information. The type field 104 is always present in a header 98 The DID field 106 is usually present in all frames, but some networks omit this field in frames where the destination is implicit or unambiguous. For example in the ARCNET LAN, the DID field is present in all token, inquiry and data packet frames, but not in acknowledgement and negative acknowledgement frames where the destination of the frame is implicit. SID field 108 may or may not be present depending both on the type of network and the type of frame. For example, in many token based networks including the ARCNET LAN, the SID 108 is not present in the token frame, and only the DID 106 is present. The control field 110 is normally both network and frame type dependent. For instance, in the case of a data packet frame, the control field 110 may be used to designate the length of the data field 100 (FIG. 6) which follows the control field 110. The control field 110 may contain command information in an inquiry frame or status information in a response frame.

In order to successfully interoperatively incorporate two or more different operational capabilities in a single LAN, the different communication protocols cannot interact with one another so as to cause errors or to generate spurious, invalid data, but yet the two protocols must create an appearance of valid activity in at least one (the common) and possibly both protocols. The protocols must not violate or conflict with one another. The protocols must be clearly separable, so the enhanced protocol and the enhanced aspects of an interface function reliably at the enhanced capability, and the basic or common protocol and basic aspects of the interface function reliably at the basic capability.

To successfully adapt a second different communication protocol and capability to a basic LAN as described herein, considerations must be given to compatibility and interoperability of the physical signals applied to the medium, the transparency of certain signals to the basic interfaces, the frames transmitted in each protocol, the basic and enhanced protocols, and other factors. Many of these compatibility considerations are described in greater detail below.

Different networks use different signals at the physical level and different communication protocols. The present invention is applicable to a variety of different networks, but the ARCNET LAN has been chosen to illustrate the interoperability aspects of the present invention. The characteristics of the ARCNET LAN are described below as the presently preferred example of the basic or common functionality, but it should be understood that the broad aspects of the present invention are applicable to other types of LANs.

The basic electrical signal applied by the basic interfaces to the LAN medium to signify a one bit is a basic sine pulse 120 illustrated in FIG. 8. In reality the pulse 120 is not a pure sine wave, but is more on the nature of a dipulse wherein the leading half cycle is similar to a half-cycle of a sine wave, but the following half-cycle is attenuated and somewhat altered compared to a sine wave half-cycle. For convenience of the description herein, the dipulse is shown and described as the sine pulse 120.

The basic sine pulse 120 commences with a positive half cycle and terminates with a negative half cycle. The sine pulse 120 is applied for a time period or interval 122, which in a standard ARCNET LAN is 200 nsec. An equal length period or interval 124 of 200 nsec of silence or absence of a physical signal follows each sine pulse 120. To transmit a one bit digital indication in the basic protocol, the basic sine pulse 120 is applied during interval 122 followed by the silence interval 124. To apply a zero bit digital indication, two periods of silence 122 and 124 exist sequentially. Thus in the basic and common protocol, the basic sine pulse 120 or a silence signal is applied in one interval followed sequentially by another interval of silence or absence of a signal. This pattern of pairs in which the second interval is always silence and the first interval is always a basic sine pulse or silence, continues to repeat.

In order to communicate in a second protocol and to achieve an enhanced data rate capability, the second interval 124 in each pair of intervals is utilized to present signals. Further, the signals applied during both intervals 122 and 124 are amplitude and phase modulated to thereby achieve even greater data transfer capabilities, as is illustrated in FIGS. 9 and 10.

As shown in FIG. 9, the signals applied in the enhanced protocol are amplitude modulated sine pulses 126 (8 amplitudes are illustrated). The sine pulses 126 are applied during each consecutive interval 122 and 124. Each sine pulse 126 commences with a positive half cycle followed by a negative half cycle. The phase of each half cycle of the sine pulses 126 is the same as that of the basic sine pulse 120 (FIG. 8). The maximum amplitude sine pulse 126 is the same waveform as the basic sine pulse 120 (FIG. 8) and thus these two signals are common to the basic and enhanced protocols. Of course, a silence signal is also common to both protocols as well.

As shown in FIG. 10, inverted amplitude-modulated sine pulses 128 (8 amplitudes are illustrated) are also applied in the enhanced protocol. The sine pulses 128 are phase inversions of the sine pulses 126. Because of the phase inversion, none of the sine pulses 128 are common to the basic sine pulse 120 (FIG. 8), and the sine pulses 128 are never a part of the basic protocol. The signals 128 are unique in that they unambiguously define the enhanced protocol.

Sixteen phase and amplitude combinations of sine pulses 126 and 128 are available for conveying data in the enhanced protocol. These 16 amplitudes will encode 16 4-bit binary code patterns from 0000 to 1111. Because each amplitude modulated signal represents four digital bits, four times as much data may be encoded by the sine pulses 126 and 128 as compared to the basic sine pulse 120. The use of each consecutive interval or period to transfer an amplitude and phase modulated sine pulse increases the signal presentation rate by two times Thus, eight times more data may be transferred by the signals shown in FIGS. 9 and 10 compared to the signal shown in FIG. 8. This eight-fold increase in the data transfer capability is an example of the enhanced data rate capability as compared to the basic data rate capability.

Means for creating the phase and amplitude modulated sine pulses 126 and 128, and for decoding these sine pulses 126 and 128 into a four-bit binary data stream is described in greater detail in the co-filed application for MULTIBIT AMPLITUDE AND PHASE MODULATION TRANSCEIVER FOR LAN.

The composition of the basic frames transmitted using basic sine pulses 120 and intervals of silence 124 is shown in FIGS. 11 to 15. The composition of the enhanced frames transmitted using amplitude and phase modulated sine pulses 126 and 128 and intervals of silence 124 is shown in FIGS. 16 to 20. All of the following descriptions are in terms of the intervals (122 or 124 FIGS. 8-10).

The logical protocol elements of each field of a frame is represented by mnemonics enclosed in angle brackets. For example, the destination identifier is depicted as "<DID>". Physical signals which occupy one basic time interval (122 or 124), hereinafter referred to as "symbols", are represented by single characters, each indicating the contents of one symbol interval. To improve readability of lengthy symbol sequences, colons (":") are inserted after a few, usually two, symbol intervals. These colons do not represent symbols The character code for the symbols is shown below

| CHARACTERS | USAGE |
| --- | --- |
| 0 . . . 9 | Fixed binary data patterns "0000"-"1001" |
| A . . . F | Fixed binary data patterns "1010"-"1111" |
| S | Silence - no physical signal during interval |
| X | Any of 16 binary data patterns "0000"-"1111" |
| Y | Any of 4 binary data patterns "0111", "0101", "0011", or "0001" |
| Z | Either F ("1111") or S (silence) |

The symbol code assignments presented above assume that the mapping of digital patterns to physical symbols uses the most significant bit of the digital data to control phase (1 = high half cycle, then low half cycle, shown by sine pulses 126; 0=low half cycle, then high half cycle, shown by sine pulses 128), and that the least significant three bits of the digital data represents amplitude (111=maximum, 000=minimum, linear encoding between). Thus, all symbols 0 to 7 will be transmitted by a sine pulse 128 (FIG. 10) which commences with a low or negative half cycle followed by a high or positive half cycle, and all of the symbols 8 to F will be transmitted by a sine wave pulse 126 (FIG. 9) which commences with a high or positive half cycle followed by a low or negative half cycle.

Following this nomenclature, and as can be understood that a basic symbol is an "F"; a silence symbol is an "S"; a common symbol is a "Z", since both the "F" or "S" symbols are applied in the basic protocol; a unique symbol is a "Y", since it applies only to the enhanced protocol; and a set symbol is an "X" because the symbols of both protocols are included in the set but a silent symbol "S" is not included in this group. Also by comparing FIGS. 8, 9 and 10, each basic signal requires two symbol intervals 122 and 124, the first symbol interval 122 to apply the common symbol (either an F or an S) and the second symbol interval where an F is always applied Thus, a one bit basic signal is represented by :FS:, while a zero bit basic signal is represented by :SS:.

Protocol elements used in constructing basic frames are as follows. A starting delimiter <SD> consists of 12 symbols: :FS:FS:FS:FS:FS:FS:. The starting delimiter is generally called an "Alert Burst" in ARCNET terminology. An ending delimiter <ED> consists of 18 symbols: :SS:SS:SS:SS:SS:SS:SS:SS:SS:. The ending delimiter is not counted as part of the length of ARCNET frames. An information symbol unit <ISU> consists of 22 symbols: :FS:FS:SS:ZS:ZS:ZS:ZS:ZS:ZS:ZS:ZS:. One byte (8 bits) is transferred, least significant bit first, in each <ISU>. All packed data areas contain an integral number of <ISU>s, hence an integral number of bytes. The RECON symbol unit is also used for the purposes described, but not to construct basic frames. A RECON symbol unit <RSU> consists of 18 symbols :FS:FS:FS:FS:FS:FS:FS:FS:SS:. The purpose of the <RSU> is to interfere with other transmissions in order to force network reconfiguration. While the exact symbol pattern of the <RSU> can occur within other types of frames, the fixed pattern (:FS:FS:SS:) at the beginning of each <ISU> ensures that there will never be two or more, sequential <RSU> symbol patterns in any type of valid frame. Using these symbols and symbol units, it is now possible to define both the basic frames (FIGS. 11-15) and the enhanced frames (FIGS. 16-20).

A token frame, also referred to as an invitation to transmit (ITT), is shown in FIG. 11. The ITT is used to pass the right of media access (the token) between nodes. The ITT consists of 78 symbols (excluding the <ED>, as mentioned above): <SD> <EOT> <NID> <NID> <ED> <EOT> is the type field and is an <ISU> containing 0×04. The notation "0×" is used in this description to designate hexadecimal code. Thus 0×04 is 04 in hexadecimal code (00000100 in binary code). The <NID> is an <ISU> containing the destination ID of the token frame, which is the address of the next active node in the logical token loop. The <NID> is repeated to minimize the possibility of transmission errors resulting in an incorrect token destination. Both received <NID> values must match for the frame to be valid and to be accepted by the destination node.

A free buffer inquiry frame (FBE) is shown in FIG. 12. An FBE is always used in the basic protocol prior to sending a non-broadcast packet to ensure that a buffer is available at the destination node to hold the packet. The FBE consists of 78 symbols: <SD> <ENQ> <DID> <DID> <ED> <ENQ> is the type field and is an <ISU> containing 0×85. <DID> is an <ISU> containing the ID of the node which is the destination of this transmission. The <DID> is repeated for reasons discussed above.

A data packet frame (PAC) is shown in FIG. 13. A PAC is used to transfer data between nodes The PAC consists of 188+22n or 210+22n symbols, where n is the number of data bytes in the packet: <SD> <SOH> <SID> <DID> <DID> <CP> <SC> <DATA> <FCS> <ED>. <SOH> is the type field and is an <ISU> containing 0×01. <SID> is a field of one <ISU> containing the ID of the node which is sending this packet. <DID> is a field of one <ISU> containing the ID of the node which is the intended destination of this packet. DID =0 is used for broadcasts to all nodes. The <DID> is repeated for reasons discussed above <CP> is a field of one or two <ISU>s indicating the number of data bytes in this packet The <CP> is only two <ISU>s in length when there are more than 252 bytes of data in the packet. <CP> encoding may restrict the ability to validly send packets with data lengths of 253-255 bytes <SC> is a field of one <ISU> containing an indication of the higher level protocol type to be used in interpreting the data field of this packet In the case of <SC> values in the range 0×81-0×BF, a second <ISU> is used as part of an extended <SC> format. <DATA> is a field of 0 to 507 <ISU>s containing the data portion of this packet. <FCS> is a field of two <ISU>s containing the cyclic redundancy check code used for error detection The <FCS> covers the data bytes of all <ISU>s from <SOH> through the end of <DATA> using the polynomial $X^{16}+X^{15}+X^2+1$.

An acknowledgement frame (ACK) is shown in FIG. 14. An ACK is used to respond affirmatively to free buffer inquiries and is also used to indicate successful receipt of packets in the basic ARCNET protocol. An ACK consists of 34 symbols <SD> <ACK> <ED>. <ACK> is a type field of one <ISU> containing 0×86.

A negative acknowledgement frame (NAK) is shown in FIG. 15. A NAK is used to respond negatively to free buffer inquiries. In basic ARCNET protocol a NAK is never sent in response to the unsuccessful receipt of a packet A NAK consists of 34 symbols: <SD> <NAK> <ED>. <NAK> is a type field of one <ISU> containing 0×15.

A RECON burst (not shown) consists of 13770 symbols <RSU> <RSU> . . . (765 total <RSU>s). A RECON burst is used to force network reconfiguration. A RECON burst is longer than any other type of transmission, and will therefore interfere with the next ITT, thereby destroying the token and forcing network reconfiguration.

All basic frames may be communicated by all the nodes of the LAN, including both basic and enhanced The basic frames are therefore common to both the enhanced and basic protocols. The enhanced protocol elements, described next, are employed only in enhanced frames.

An enhanced starting delimiter <XSD> consists of 3 symbols: :FS7:. The first two symbols of the <XSD> serve as an initial receiver calibration pulse used to establish the analog gain, intersymbol interference correction value and demodulator timebase reference in the receiver in the destination node or nodes, and the third symbol (a maximum-amplitude, inverse-phase sine pulse 128, FIG. 10) unambiguously identifies an enhanced transmission frame since no basic transmission frame contains this unique inverse-phase symbol.

The initial "FS" is identical in the <SD> and the <XSD>, permitting basic interfaces and basic hubs to detect the start of enhanced frames as network activity. Several timeout intervals in the basic link level protocol (discussed below) depend on detection of network activity, so it is important that the first symbols of enhanced frames always set the activity indicators in all nodes. Also, active hubs require the appearance of network activity to latch into a non-idle state in which they repeat the incoming active signal on all other ports.

An enhanced Information Symbol Unit <XISU> consists of 2 symbols: :XX:. One byte (8 bits) is transferred in each <XISU>, least significant nibble (4 bits) in the first symbol and the most significant nibble in the second symbol. All enhanced packet data areas contain an integral number of <XISU>s, hence an integral number of bytes. An enhanced Calibration Symbol Unit <XCSU> consists of 3 symbols: :SFS:. An <XCSU> is inserted after every 8 <XISU>s in the data fields of data packets. These periodic <XCSU>s allow periodic recalibration of the gain, inter-symbol interference correction value and receiver clock synchronization of the receivers in enhanced nodes. The <XCSU>s also appear as normal network activity to basic receivers, since the "FS" portion of the <XCSU> is identical to a basic one bit transmission. This periodic guarantee of basic signal activity prevents any basic nodes from forcing network reconfiguration due to apparent inactivity during enhanced frames. In configurations using active hubs as part of the physical media, this periodic guarantee of basic signal activity prevents any hubs from dropping into the idle state due to apparent inactivity during enhanced frames. The "S" symbol which precedes the "F" symbol in the <XCSU> allows inter-symbol interference from the preceding symbol to die out before calibrating the gain and receiver clock synchronization using the "F" symbol in the <XCSU>. The "S" symbol which follows the "F" symbol in the <XCSU> allows the receiver to measure, and compensate for, the amount of inter-symbol interference currently being generated by the medium.

The enhanced protocol elements are incorporated into enhanced transmission frames in the manner illustrated in FIGS. 16 to 20.

An enhanced token frame (XITT) is transmitted at the common rate from an enhanced node to a basic node and may also be received by an enhanced node. An XITT is shown in FIG. 16. The XITT is also used during token passing to any type of node during network reconfiguration. The XITT consists of 78 symbols (the same length as an ITT) :FS:FF:FZ:FZ:FZ:FZ <EOT> <NID> <NID>. <ED> <EOT> is an <ISU> containing 0×04. <NID> is an <ISU> containing the ID of the next node in the logical token loop. The initial 12 symbols of the XITT will appear to basic nodes to be an <SD>, because the "F" and "Z" symbols in the fourth, sixth, eighth, tenth and twelfth symbol intervals are not recognized by the basic nodes.

Basic nodes detect the initial "FS" of an <SD> and then skip over the successive "F" symbols until they detect the "SS" in the fifth and sixth symbol positions of the first <ISU>. Accordingly, the XITT will be indistinguishable from an ITT at basic nodes. The first two symbols (:FS:) serve as an initial calibration pulse, while the third symbol being "F" rather than "7" identifies this transmission as being in basic protocol rather than enhanced protocol. The fourth symbol being "F" rather than "S" permits enhanced nodes to recognize the frame as an XITT, and to decode the four "Z" symbols in the remainder of the starting delimiter. The four "Z" symbols contain the data rate and status information of the node passing the token as is discussed below. The fact that the starting delimiter contains ancillary information in the fourth, sixth, eighth, tenth and twelfth symbol intervals can be unambiguously determined by the presence of one or more "F" symbols inserted among these five locations. In the preferred embodiment only four "Z" symbols are needed, so the fourth symbol is always sent as an "F", which simplifies enhanced receiver design. If more information were available to encode in the XITT, this fourth symbol could be a "Z". Note that while standard starting delimiters transmit these symbols as "S", inter-symbol interference in basic signals could make low amplitude "Z" symbols appear to enhanced nodes as non-S values of small amplitude, so "F" symbols are preferred as inserted symbols.

An additional symbol can be beneficially inserted into the second symbol interval of the first <ISU> of the XITT frame. This inserted symbol should be an intermediate amplitude, high-then-low phase symbol, such as a "C" which is used as an example in the following description. The first <ISU> of the XITT is therefore transmitted as :FC:FS:SS: . . . rather than FS:FS:SS: . . . If the network medium between the transmitting enhanced node and any particular receiving enhanced node is capable of correctly communicating this intermediate amplitude signal, the symbol in the second interval of this <ISU> will be received correctly, as a "C". However, if the network medium between the transmitting enhanced node and the receiving enhanced node can only communicate the basic signal, the transmitted "C" in the second symbol interval of this <ISU> will be received as either an "F" or an "S" due to the thresholding inherent in the two-level (F or S) basic signaling protocol.

The detection of a non-"C" symbol in the second symbol interval of the first <ISU> of the XITT frame signifies to the receiving enhanced node that the sender of this XITT is an enhanced node but the receiving enhanced node must communicate with the sending enhanced node at the basic rate due to the inability of the medium between this pair of nodes to transfer the enhanced symbols. The :FC: will be indistinguishable from an :FS: or :FZ: at basic nodes, so the XITT will still be interpreted as an ITT by such basic nodes.

The situation where the inserted "C" is useful in detecting medium paths incapable of transferring the enhanced symbols occurs most commonly in networks employing active hubs. Although much of the network cabling suitable for conveying the basic signals can also adequately carry the enhanced signals, basic active hubs are not capable of repeating any symbols except F and S. Accordingly, if a network has enhanced nodes interconnected through a basic active hub, those enhanced nodes require means to detect this hub limitation of the medium. While each of the affected enhanced nodes can communicate at the enhanced rate with other enhanced nodes connected on the same side of the basic active hub, the basic rate must be used when communicating through that basic hub.

The inserted intermediate amplitude symbol (e.g. "C") is primarily applicable to embodiments of the present invention which use a single, multi-mode transceiver rather than a plurality of separate receivers 64, 66 (FIG. 3). A multi-mode transceiver is disclosed in the co-filed application for MULTIBIT AMPLITUDE AND PHASE MODULATION TRANSCEIVER FOR A LAN.

The 5 information symbols imbedded in the starting delimiter of the XITT also form a flag which permits enhanced nodes to detect each other's presence on the network and to determine each other's capabilities, which can assist network management facilities to optimize network operation. Usage of these flag bits is as follows (bit 0 is transmitted in the fourth symbol of the starting delimiter):

| BIT | USAGE |
| --- | --- |
| 0 | Flag Format |
| | 1 = Standard flag format (as shown below) |
| | 0 = Alternate flag format (not currently used, must guarantee at least one non-zero bit in the remainder of the flag if used.) |
| 1 | Transmitter Enabled (TXE) |
| | 0 = Transmitter disabled at the enhanced interface sending this XITT (known as Transmitter Available — TA - status in ARCNET terminology). |
| | 1 = If there are additional packets awaiting transmission at the enhanced interface sending this XITT. |
| | This bit will only be set (=1) by an "intelligent" enhanced interface which maintains a queue of outgoing packets and may, in some cases, be forced to pass the token while untransmitted packets remain on this queue. Sending an XITT with TXE=1 implies that the enhanced interface will be ready to transmit a packet if the token is immediately passed back to it, as might be the case under certain network management methodologies such as that discussed more completely in co-pending application Ser. No. 154,970, filed February 11, 1988 for UNEVEN TOKEN DISTRIBUTION TECHNIQUE FOR TOKEN BASED LOCAL AREA NETWORK, assigned to the assignee hereof. |
| 2 | Receiver Enabled (RXE) |
| | 0 = Receiver inhibited (RI) at the enhanced interface sending this XITT. |
| | 1 = Receiver enabled at the enhanced interface sending this XITT. |
| | This bit indicates the receiver status at the time the token is passed. There is no assurance that the same receiver status will exist for the duration of the current token loop. The major use of this status bit is to assist in determining whether an optional inquiry facility of the enhanced protocol, described below, should be used when attempting to send a data packet of this node. |
| 3–4 | Speed Capability |
| | 00–2.5 Mbps (Common) |
| | 10–20 Mbps (Enhanced) and 2.5 Mbps |
| | 01 - reserved for future use |
| | 11 - reserved for future use |

The remainder of the XITT frame is identical to an ITT frame.

A speed token frame (XTOK) is shown in FIG. 17. The XTOK is used to pass the token from an enhanced node to another enhanced node at the enhanced rate. An XTOK consists of 10 symbols: <XSD> Y <XNID> <XNID> <ED> <XNID> is 3 symbols containing the ID of the next enhanced node in the logical token loop. The <XNID> is repeated for reasons discussed above. The "Y" symbol following the <XSD> indicates that this frame is an XTOK, and also encodes the transmitter and receiver status as shown below:

```
0111 - TXE=1, RXE=1
0101 - TXE=0, RXE=1
0011 - TXE=1, RXE=0
0001 - TXE=0, RXE=0
```

The definitions of TXE and RXE have been described above in conjunction with the XITT.

An enhanced inquiry frame (XENQ) is shown in FIG. 18. An XENQ is used to initiate control functions and to request status replies from enhanced nodes. The XENQ consists of 14 symbols: <XSD> 9 <XDID> <XDID> <CTL> <CTL> <ED>. <XDID> is 3 symbols containing the ID of the enhanced node which is the destination of this frame. <CTL> is an <XISU> containing a control byte which indicates the type of inquiry function being requested. The <XDID> and <CTS> are repeated for reasons discussed above. One code value assigned is 0×01, which requests an immediate response to report receiver status (which is the enhanced equivalent to the FBE). Other code values can be assigned for other types of desired responses. Every XENQ requires the addressed enhanced node to send a response (XRSP) within the predetermined response timeout period.

An enhanced response frame (XRSP) is shown in FIG. 19. An XRSP is used to acknowledge the receipt of enhanced data packet XPAC frame and to respond to a XENQ frame. The XRSP consists of 8 symbols: <XSD> :D: <STAT> <STAT> <ED>. <STAT> is an <XISU> containing the status information of the node at the time of the response, according to these code assignments:

| STAT | USAGE |
| --- | --- |
| 0x01 | Data Packet received successfully (when responding to an XPAC) or Receiver enabled (when responding to an XENQ) |
| 0x02 | Data Packet received with correctable errors |
| 0x09 | Receiver inhibited |
| 0x0A | No free buffer available |
| 0x0B | Packet received with uncorrectable errors |

The <STAT> is repeated for reasons discussed above.

An enhanced data packet frame (XPAC) is shown in FIG. 20. An XPAC is used to transfer data between enhanced nodes. The XPAC consists of 29 symbols plus the data bytes with imbedded <XCSU>s: <XSD> F: <XSID> <XDID> <LNG> <SC> <XCSU> <DATA> <FCS> <ED>. <XSID> is 3 symbols containing the ID of the enhanced node which is sending this packet. <XDID> is 3 symbols containing the ID of the enhanced node which is the intended destination of this packet. (DID=0 for broadcast to all enhanced nodes ) <LNG> is two <XISU>s (4 symbols) containing a (13-bit) integer which defines the number of data bytes in this packet (valid range 0–4224). <SC> is two <XISU>s (4 symbols) containing an identifier of the higher level protocol type for use interpreting the data field of this packet. <DATA> is a multiple of 8 between 0 and 4224 (inclusive) of <XISU>s containing the data portion of this packet, with an <XCSU> inserted after every 8 <XISU>s. If the number of data bytes indicated by the <LNG> is not an integral multiple of 8, the contents of the data field are padded with 1-7 bytes to force the physical number of data bytes to be a multiple of 8, so that the <DATA> field will be followed immediately by an <XCSU>. These pad bytes are not included in the <LNG> value. <FCS> is four <XISU>s containing the cyclic redundancy check code used for error detection. The <FCS> covers the data in all symbols, other than those symbols which make up the <XCSU>s, from the ":F:" immediately following the <XSD> through the end of <DATA>. To reduce the need for re-transmissions due to data errors on the medium, an error correcting code, oriented toward correcting burst errors in multiples of 4-bit groups, may be substituted for a CRC code in the FCS field.

In order for the enhanced nodes of the LAN to take effective advantage of the enhanced protocol, means must be provided for communicating the enhanced capabilities between the enhanced nodes. One example of means for communicating the enhanced capabilities is to imbed or insert the rate and status information in the XITT and XTOK as noted above. Other examples, including the use of inquiry (XENQ) and response (XRSP) frames, are described in the co-filed application LAN WITH DYNAMICALLY SELECTABLE OPERATIONAL CAPABILITIES.

The arrangement of symbols described in conjunction with FIGS. 16 to 20 provides an unambiguous approach to discriminating the enhanced frames while appearing to basic interfaces as basic network activity. The third symbol of each frame provides the ability for this discrimination. If the third symbol is of a high-then-low phase, the frame is being sent using the basic signal. However, if the third symbol is low-then-high phase the frame is being sent using the enhanced signal. The network protocol controller 70 (FIG. 3) checks the third symbol, and if it is determined that the third symbol is a basic symbol, the basic protocol for decoding the frame will be selected. If the third symbol is not a basic symbol but an enhanced symbol, as described above, the network protocol controller will select the enhanced protocol for decoding the frame. The network protocol controller 70 (FIG. 3) may select the appropriate receive channel (64 or 66) through the receiver selector (discriminator 74, via control signal 86, based on this third symbol. Alternatively, the discriminator 74 may detect the phase of the third symbol directly from the receiver via signal 76 and select the appropriate receive channel (64 or 66) without input from the network protocol controller 70.

In order to accurately determine the amplitude of the sine pulses 126 and 128 (FIGS. 8 and 9) it is necessary to periodically recalibrate the receiver at each receiving node. Recalibration is achieved by periodically sending calibration pulses in <XCSU>s (:SFS:). Each calibration pulse is the sine pulse 120 (FIG. 8), an "F" symbol, which is the same as the maximum-amplitude, standard phase sine pulse 126. These calibration pulses are periodically inserted in the data field of XPAC frames, and elsewhere as needed. Another requirement is that the receiver must sample signals derived from the incoming sine pulses 126 and 128 at their maximum amplitude points. A sampling technique for accomplishing this is to obtain the mathematical derivative of the signals derived from the sine pulses, and then sample the peaks of these derived signals when the derivative crosses zero. Means for calibrating the gain of the receivers and for sampling at the maximum peak value is described in greater detail in the co-pending application for MULTIBIT AMPLITUDE AND PHASE MODULATION TRANSCEIVER FOR A LAN.

One of the very important considerations with respect to interoperability is that the enhanced protocol and the enhanced frames do not violate any of the basic protocol characteristics. It is not enough that each enhanced frame can be distinguished from a standard frame by the inverse phase symbol in the third frame of the starting delimiter, but the remaining symbols in each enhanced frame must still appear as standard activity to the basic nodes. In order to prevent the basic nodes from timing out, and initiating a network reconfiguration each basic node must detect network activity (at least one "FS") within its activity timeout period (78.4 usec for standard ARCNET). In order to eliminate the small possibility that the middle of an enhanced frame could be misinterpreted as the beginning of a basic frame, each basic node must detect network activity (at least one "FS") every 4.4 nsec. The enhanced protocol insures these characteristics by automatically inserting calibration pulses SFS: on a periodic basis (every 3.8 usec in the preferred embodiment) Insertion (and removal) of these calibration pulses is achieved automatically at the link level by action of the protocol controller 70 (FIG. 3). Of course, these calibration pulses also serve the beneficial purpose of adjusting the gain, receiver clock synchronization and inter-symbol interference correction of each receiver in each enhanced interface, as previously mentioned.

The calibration pulses also serve an analogous purpose with respect to the hubs 44 (FIG. 1). Active hubs serve as repeater-amplifiers by detecting the first one of the connected communication links which carries a signal, and thereafter latching the other links as output terminals and applying an amplified signal to those output links. After each transmission, the hub waits for a fixed period of time before unlatching the output links. This waiting period is long enough to assure that signal reflections die out on all of the output links. By providing the calibration pulses, there is an assurance that the basic hubs will not unlatch the output links before the end of the enhanced transmission. New hubs capable of transmitting data at the enhanced rate must be present in those segments of the network where enhanced frames are communicated, but basic hubs may continue to be used on branches of the network which contain basic nodes. The inserted intermediate amplitude symbol in the XITT allows detection of situations where basic hubs exist in the communication path between two enhanced nodes, as discussed above.

Another issue of compatibility relates to the electrical signals themselves, and the symbol intervals. By maintaining one of the enhanced signals (an "F") the same as the standard signal, and by applying enhanced signals in the same symbol intervals, what appears to be normal network activity is achieved. This also simplifies the communication from enhanced nodes to basic nodes, since the enhanced protocol controller can send and receive basic protocol frames using sequences of "F"s and silence ("S").

Another important consideration regarding interoperability is the ability to hide enhanced information in the frames which appear to all basic nodes as basic frames. The use of the enhanced token (XITT) to communicate rate and status information among enhanced nodes while passing what appears to the basic nodes to be the basic token effectively maintains normal network operation, while still communicating the enhanced rate and status information between the enhanced nodes so the enhanced nodes may dynamically select the enhanced protocol when communicating with other enhanced nodes.

The greater communication rates and the additional information regarding the enhanced nodes, such as receiver and transmitter status, can be effectively incorporated in an enhanced communication protocol which differs from the basic operating protocol. For example, the basic protocol always requires an inquiry (FBE) to be sent to the destination node to determine if the destination node has a free buffer available to receive the data packet which the source node proposes to send. Time is consumed to send the FBE, to wait the interframe gap time (12.6 usec in standard ARCNET), to receive the response from the destination node (an ACK or NAK), and to wait another interframe gap time before actually transferring the data packet. In contrast, the rate and status information which can be imbedded in each token as it is passed may be advantageously used to avoid having to send the inquiry and receive the response, and therefore utilize the time normally consumed by the inquiry and response for the productive transfer of data. Consequently, utilizing the enhanced protocol the data packet may be sent directly to the destination node after the source node receives the token.

To provide an indication of the successful receipt of an XPAC, the enhanced node will either affirmatively acknowledge (XRSP with successful delivery status) or negatively acknowledge (XRSP with unsuccessful delivery status) the receipt of the data packet. This again is another example of the departure of the enhanced protocol from the basic protocol. In the basic protocol, the successful receipt of data packets is always affirmatively acknowledged (ACK), but the unsuccessful receipt of packets is never negatively acknowledged. In the basic protocol, the unsuccessful receipt of a data packet results in no response from the destination node. The lack of a response may mean that the packet was received in error, or it was not received at all, or even perhaps that it was received successfully but the response (ACK) was not successfully received by the original source node. The lack of an ACK to a data packet in the basic protocol might result in the source node re-transmitting the same packet the next time the source node received the token.

Additional advantages of the enhanced protocol in negatively acknowledging the unsuccessful receipt of a packet is that certain response codes for the unsuccessful receipt can be incorporated in the negative response. This additional information can be used by the source node to attempt the transmission under better circumstances at a later time. For example, if the negative response indicated that no free buffer was available, the next time the source node attempted the transmission it might send an XENQ before attempting the packet transmission.

By incorporating the status information regarding the transmitters and receivers at each enhanced node as that node passes the token, all of the other enhanced nodes may keep track on a fairly current basis of the status of the other enhanced nodes. There is a reasonable presumption that during a fraction of a token loop, the status of each node has probably not changed. However, one approach to maximizing the efficiency for transferring data packets is to have the host processor or protocol controller at each enhanced node monitor the receiver status at other enhanced nodes Based on the changes in the receiver status as observed over a number of subsequent token loops, the probability of whether the receiver at the particular enhanced node is likely to be inhibited could be determined. If the probabilities favor such inhibition, data packet transmissions to that particular node might always commence with an XENQ.

Another somewhat similar procedure is to monitor whether a particular enhanced node ever transmitted a XRSP response to an XPAC indicating a receiver inhibited status. Again, based on the number of receiver inhibited status indications, and the frequency with which they occur in relation to the token loops, a determination could be made as to the probability of whether the XPAC should be transmitted immediately or an XENQ should be sent prior to attempting the data packet transmission.

Another algorithm for determining when to precede an XPAC with an XENQ relates to the length of the XPAC. For example, XPACs with 48 or less data bytes take less time to transmit than to transmit an XENQ and an XRSP including their IFGs, so they could always be sent without an XENQ. Based on measurements of efficiency on a particular network, a threshold length greater than 48 bytes could be determined below which the use of an XENQ is unjustified.

The status information regarding the transmitter in each enhanced node might be used in redirecting the token back to the particular enhanced node if it has further transmissions to make. A technique for redirecting the token out of the normal even rotational sequence of token passing is described in U.S. patent application Ser. No. 154,970, filed Feb. 11, 1988, for UNEVEN TOKEN DISTRIBUTION TECHNIQUE FOR TOKEN BASED LOCAL AREA NETWORK, assigned to the assignee hereof. The disclosure of this previously filed application is incorporated herein by this reference. The receiver and transmitter status indications can otherwise be used for additional useful purposes.

Another useful purpose achieved by the multiple data rate capability between enhanced nodes is that the speed token XTOK can be passed between the enhanced nodes at the higher rate than the normal token ITT or the enhanced token XITT can be passed. To optimize the benefit of passing the XTOK, all of the IDs of the enhanced node should be grouped together with their addresses sequential in the token passing loop. Thus, the token could be passed through all of the sequential enhanced nodes in rapid order (2 usec/XTOK in the preferred embodiment), rather than slowing down the speed which would occur if the enhanced nodes were interspersed with basic nodes in the logical token passing loop (15.6 usec/ITT in standard ARCNET}. This is illustrated in FIG. 4 by the short dashed lines 48 connecting nodes 21, 29 and 39 of the token loop.

A further useful departure from the basic protocol is the ability to implement an error correcting code in the FCS field of the data packets. The basic protocol utilizes only a cyclic redundancy code (CRC), which is useful only in detecting errors, not correcting them. The incorporation of an error correcting code, as opposed to an error detecting code, is a significant improvement. The enhanced protocol controller at the destination node can utilize the error correcting code to accomplish the error correction in many cases without requiring re-transmission of the data packet by the source node.

The functionality of the present invention is preferably implemented by the network protocol controller 70 (FIG. 3). This network protocol controller is preferably a microsequencer operating from firmware, although some of its functionality could be achieved by higher level software within the host processor or other means. The logic flow of operations implemented by the network protocol controller is illustrated in the flow charts shown in FIGS. 21A, 21B, 21C, 22, 23, and 24. In discussing the flow charts, a convention which will be followed is that the step or functionality described in the following text will be numbered and enclosed in parentheses to correspond to the step or functionality identified by the corresponding reference numeral in the drawings. Also, there is a direct correspondence between the basic operation or protocol of a basic interface, and the enhanced operation or protocol of an enhanced interface. This correspondence exists by virtue of the fact that the network protocol controller 70 (FIG. 3) must implement both the enhanced and the basic protocols. Accordingly, the basic logic flow is included as a subpart of the overall enhanced logic flow illustrated.

All operations at either a standard or enhanced node begin in an idle loop. The idle loop is illustrated in FIG. 21A where an activity timer is initialized (150), and a waiting loop (152, 154) is entered during which activity on the medium must be detected before a time out period (154). The activity which must be detected within the predetermined time out period is the basic protocol requirement that at least one basic sine pulse (120, FIG. 8) must be received within 22 symbol periods. Testing for the time out condition in the idle loop does not commence until the LAN medium becomes silent, as defined by at least 23 symbols of silence. Once silence is detected, a time out period at 82.2 usec (for standard ARCNET) begins, and if any activity occurs over the LAN medium during this interval, no time out of the idle loop (152, 154) will occur. In order to avoid the possibility of a time out from the idle loop, the calibration pulses <XCSU>s are inserted automatically by the network protocol controller after every 16 symbol periods (8 <XISU>s) during an XPAC, as has been previously described. Because the basic and enhanced activity look the same at the level of detecting sine pulses there is only one idle loop regardless of whether the interface is a basic or enhanced interface.

If a time out occurs (154) due to the lack of activity on the medium (152) for the time established by the activity timer (150) a reconfiguration sequence will be entered. The capability table 84 (FIG. 3) of the enhanced node is initialized (156). The initialized state of the capability table is that all status and rate capability information with respect to all of the other nodes is set to a basic capability and the PID address of each node is initialized to zero. PID stands for the ID of the previous node which held the token. Since a source identification field is not included in any token, it is necessary to determine the address of the node sending the token. This address of the previous node passing the token (PID) is determined by a procedure described in greater detail in the application LAN WITH DYNAMICALLY SELECTABLE MULTIPLE OPERATIONAL CAPABILITIES. Since the capability table is only included in enhanced interfaces 70 (FIG. 3), the step of initializing the table only occurs in enhanced nodes.

The system reconfiguration sequence can also be entered upon the time out (158) of a reconfiguration timer. The reconfiguration timer establishes the maximum amount of time which may pass at any node before that node receives the token. If the node does not receive the token within that predetermined time period, it sends (160) a RECON burst. Of course, the RECON burst is also sent (160) when a new node is powered on (162) or becomes active, as has been previously described. The RECON burst forces network reconfiguration, and the first step in network reconfiguration is that each individual node must read (164) its own ID which is assigned to is and initialize (156) the capability table and PID as have been described.

The remaining portion of the reconfiguration sequence starts with each node setting (166) the NID to which the token is to be passed to its own ID. A timer is thereafter started (168) which sets the maximum allowable time period for each particular node to wait before it initiates the token passing to establish the token loop. The active node with the highest assigned ID will start the token passing to establish the token loop. So long as prior nodes continue the token passing activity in the reconfiguration sequence, there will be activity on the medium (168) and there will be no time out (170). However, if a time out does occur as will be the case with the active node of the highest ID, that node will commence passing the token (174) to start the procedure to establish the token loop.

Although not shown in the drawings, but described previously, if the token passed does not result in activity being detected within a predetermined time out after the token is passed, the node will enter into a partial reconfiguration activity where it increments its NID by the procedure previously described to locate the next active node in the token loop. This procedure occurs when a previously active node becomes inactive and drops out of the token loop. By engaging in the partial reconfiguration, the next active node in the token loop is established without all of the nodes in the token loop having to undergo network reconfiguration.

Referring now to FIG. 21B, upon observing activity, each node will check (176) the third symbol. If the third symbol is a basic symbol, the node will receive and decode (178) the header associated with the basic frame transmitted. If the third symbol is a "7", the enhanced frame will be received and decoded (180) and a determination of the enhanced header made. A "7" as the third symbol of an enhanced frame is an inverse phase sine pulse (128, FIG. 10) which unambiguously identifies the enhanced transmission, as previously described. The inverse phase sine pulse will not be recognized by a basic interface. If the check (176) of the third symbol reveals any symbol other than a "7" or a basic symbol, the end of the frame is detected (181) and thereafter the idle loop is entered.

It should be noted that attempts by a basic node to decode (178) an enhanced frame will result in the return to the idle loop, because the format of the enhanced frames is different than the format of the basic frames A similar situation exits when the enhanced frames are decoded (180). Although the determination (176) of the third symbol should relegate all incoming transmissions to either the basic or enhanced decoding (178, 180, respectively), in situations where the physical electrical signals may not unambiguously determine the type of transmission, the decoding (180) will cause the process flow to return to the idle loop if the frame format decoded (180) does not match the predetermined enhanced format.

If a basic frame is decoded (178) as a PAC, a check is made (182), as shown in FIG. 21C, to determine if the receiver in this node is enabled. If the receiver is not, the packet is ignored and the idle loop is entered. If the receiver is enabled, the packet is received and checked (184) at the common rate using the basic protocol. If the packet is not addressed to this particular node, the idle loop is entered. If there is a data error in the received packet, the idle loop is also entered. If the packet is a broadcast, the receiver is disabled (186) and the host processor of the node is informed. Thereafter the idle loop is entered. If there was no error in the packet as it was received, and therefore a normal packet was received in acceptable condition, an ACK is sent (188), the receiver is disabled (186), the host processor is informed (186) and the idle loop is entered Receiving and checking the packet (184) also validates the DID. If the DID is not addressed to this node the idle loop is entered.

If the decoding (178, FIG. 21B) of the incoming basic frame indicates that it is an FBE, the protocol controller checks (190) to determine if the receiver is enabled. If the receiver in this particular node is not enabled, a NAK is sent (192) and the idle loop is thereafter entered. If the receiver is enabled, an ACK is sent (194), and the idle loop is entered. Sending the NAK indicates that the receiver is not able to receive the packet. Generally, this condition will occur when insufficient buffer space exists in the interface to receive the packet. Of course the ACK will be sent (194) when the receiver is in proper condition to receive the packet.

If the decoding (178, FIG. 21B) indicates that the incoming basic frame is an ITT, the DID of that token is saved (196). The saved DID (196) will be employed in the manner described more completely in the application LAN WITH DYNAMICALLY SELECTABLE OPERATIONAL CAPABILITIES, to ascribe (198) the rate and status capabilities contained in the token with the previous node passing the token Thereafter, as shown in FIG. 21C, a check is made (199) of the DID in the token frame to determine whether the token is addressed to this node. If not, the idle loop is entered. If so, the reconfiguration timer is restarted (200). A check is made (202) to determine if a transmission is pending If a transmission is pending, the node enters the transmission sequence 204, which is described in greater detail below in conjunction with FIGS. 22 and 24. If no transmission is pending, the token is passed (206). After passing the token the node returns to the idle loop.

If the incoming frame is decoded (178, FIG. 21B) as an XITT, the DID of the XITT is saved (208) The rate and status information imbedded in the XITT is thereafter decoded (210). The rate and status information will be recorded (212) in the capability table based on the value of the PID, and then the PID value will be updated with the new token's DID value (198). If the second symbol of the first <ISU> of the XITT is not "C", the recorded data rate capability will be basic even though the XITT flag might indicate enhanced speed capability. Thereafter, the logical sequence is the same as that described in conjunction with the conventional token ITT, following the logical steps at 198, 199, 200, 202, 204 and 206.

The transmit sequence (204) must be entered each time the node receives a token addressed to the node, if a transmission is pending (202), because the token signifies the right of access to the medium to initiate communications. The transmit sequence (204) is illustrated in FIG. 22. Initially, a determination is made (214) to determine if the transmission to be sent by this node is a broadcast. If it is, the packet is sent at the basic rate (216). Since the packet was a broadcast (218) the transmitter is disabled (220) and the host processor of the node is informed If it is determined that the frame to be transmitted is not a broadcast (214), the DID of the packet is checked (222) in the capability table. The DID and the capability table value associated with this DID will indicate that either an enhanced node or a basic node is the destination of the transmission. If the DID specifies a basic node, an FBE will be sent (226) in accordance with the requirements of the basic protocol.

The node will then enter a waiting loop to determine (228) if activity on the medium occurs within a fixed time out period. If no activity occurs, the transmitter will be disabled (220) and the host computer will be informed. If the activity does occur within the fixed time, the activity will be tested (230) to determine if it is an ACK. If not, the transmit sequence will be ended (221). If an ACK is received, the packet will be transmitted (216), the transmission will be determined (218) not to be a broadcast, and a waiting loop will be entered to determine (232) whether activity occurs within a set time period after transmitting the packet. If no activity occurs within the set time period, the transmitter will be disabled, the host informed (220), and the transmit sequence ended (221). If activity is detected within the predetermined time period, that activity is tested (234) to determine if it is an ACK. If it is, the acknowledgement is indicated (236) to the host processor of the node, the transmitter is disabled and the host processor is informed (220) before the transmit sequence is terminated (221). If the activity tested (234) is not an ACK, the transmitter is disabled, the host is informed (220) and transmit sequence is ended (221) without indicating an acknowledgement to the transmitted packet to the host processor.

Other than checking the DID and the compatibility table (222) the sequence just described in conjunction with FIG. 22 is a basic transmit sequence for a basic node. When the transmit sequence is ended as a result of disabling the transmitter and informing the host (220), the information supplied to the host indicates successful accomplishment of the transmission, or a non-existent destination, depending on the path by which the step (220) was reached. Other exits (221) from the transmit sequence indicate that the attempted transmission was not completed, and therefore the transmitter remains enabled to attempt a retransmission of the same frame on a subsequent token reception. Of course, all exits (221) from the transmit sequence proceed to passing the token (206, FIG. 21C.

When an enhanced frame is detected by the presence of an inverse phase third symbol (176, FIG. 21B), it is decoded (180) to determine the type of enhanced frame. If an XPAC is decoded (180) the receiver is checked (238). If the receiver is not enabled, the end of the incoming packet is detected (240) and thereafter a negative XRSP is sent (242) which indicates a receiver inhibited or no free buffer status, followed by a return to the idle loop.

If the receiver is enabled (238) the packet is received and checked (244) at the enhanced rate If upon checking (244) the packet, if a data error is determined which is uncorrectable a negative XRSP is sent (246) indicating an uncorrectable error. The idle loop is thereafter entered. If the packet is received in acceptable condition, but it is not addressed to this particular node, a return to the idle loop occurs. If the packet is received in acceptable condition and is a broadcast, the receiver is disabled (186, FIG. 21C), and the host processor is informed. Thereafter the idle loop is entered. If a normal packet is received in acceptable condition and is addressed to this node, an affirmative XRSP is sent (248). Thereafter, the receiver is disabled (186, FIG. 21C) and the idle loop is entered.

If the incoming activity is decoded (180, FIG. 21B) as an XENQ the receiver of this node is checked (250) to determine if it is enabled. If so, an affirmative XRSP is sent (252) and the idle loop is entered. If not, a negative XRSP is sent (254), indicating a receiver inhibited status, and the idle loop is entered.

If the incoming enhanced activity is decoded (180, FIG. 21B) as an XTOK the DID of the XTOK is saved (256), and the rate and status information is also decoded (258). Thereafter the previously described functionality of recording (212) the information in the capability table, setting the PID to the saved DID (198), testing for tokens addressed to this node (199), restarting (200) the reconfiguration timer, and determining whether a transmission is pending (202) are exactly as have been previously described. Enhanced data rate capabilities are always recorded in the capability table as a result of an XTOK, since the transmitting node obviously has an enhanced capability by virtue of sending a valid XTOK. When a packet is sent to a basic node in the transmit sequence (204), the logic flow for a basic transmission has been previously described in conjunction with FIG. 22.

A transmission to an enhanced node will now be described in conjunction with FIG. 22. If the transmission is to an enhanced node, this is determined (222) by the information in the capability table After determining (222) that the packet is to be sent to an enhanced node and that an enhanced transmission is possible, it is determined (260) whether inquiries are enabled or disabled. Sending an XENQ is optional with the enhanced protocol. An XRSP will always be sent to an XENQ, and the procedure is very similar to that in the basic protocol except that the data rate for transmitting the XENQ and XRSP is at the enhanced rate. Determinations with respect to enabling or disabling inquiries are generally handled by algorithms described above, based on the status or history of the destination node, length of the packet, or by software of the host processor. Those determinations can be made based on the approaches previously discussed among others. If inquiries are disabled, the enhanced packet is sent (262). If not, a waiting loop is entered to determine whether or not activity is received within a set time (266). If not, the transmitter is disabled, the host informed (220) and the transmit sequence is ended (221) If activity is received within the set time, that activity is checked (268) to determine if it is an affirmative response. If an affirmative response is received, the packet is indicated (236) as acknowledged. If an affirmative response is not detected (268) the transmit sequence is terminated (221).

If inquiries are not disabled (260) an XEXQ is sent (270) and a waiting loop is entered to determine (272) if activity occurs within a set time. Activity is checked (274) to determine if it is an affirmative response. If so, the XPAC is sent (262) and the sequence previously described (264, 266, 268, etc.) proceeds. If the activity is determined (274) not to be an affirmative XRSP, the transmit sequence is ended (221).

In all cases of exiting from the transmit sequence when an enhanced transmission has been attempted, the transmitter is not disabled, and the transmission has not been affirmatively acknowledged, the protocol controller and/or host software will keep track of such circumstances and attempt the transmission again the next time the token is received. Such attempts continue until the software of the host determines that further continued attempts will be unproductive.

The token passing procedure (174, FIG. 21A and 206, FIG. 21C) for enhanced nodes is illustrated in FIG. 23. At the start of the token passing procedure, the ID of the node to which the token is addressed (NID) is checked (276) in the capability table. If the capability table indicates that the next node in the token passing loop is an enhanced node, the speed token XTOK will be sent (278) at the high data rate. If the capability table indicates that the NID is a basic node, an XITT will be sent (280) at the common rate. Thereafter, the determination (282) will be made as to activity occurring on the LAN medium within a fixed time. If not, the NID will be incremented by one (284) and the procedure illustrated in FIG. 23 will be repeated, at the common rate, in order to establish the NID of the next active node. This partial reconfiguration procedure applies when a previously active node becomes inactive as has been previously described. If the activity occurs within the fixed time (282), the idle loop will be entered from either (174) or (206).

The enhanced transmit sequence previously discussed in conjunction with FIG. 22, and the logic sequence outlined in FIGS. 21A, 21B and 21C relates to determining the enhanced rate capability and status information imbedded in the token as it is passed among the active nodes in the token passing loop. Another embodiment of the present invention provides for the capability of determining the enhanced rate and status information in a negotiation-like procedure which occurs between the source and destination nodes of a communication. This determination occurs on a packet-by-packet basis. The flow diagrams of FIGS. 21A, 21B and 21C essentially describe this activity, with the exception that all of the process steps of saving the NID of the token, and determining rate and status information from the capability table are unneeded. Furthermore, the capability table is not needed. Instead, the rate and status information is imbedded in and transmitted between the source and destination nodes in an inquiry and response. In accordance with this packet-by-packet determination, either the source node or the destination node may select the rate for transmission. This is described in greater detail in the co-filed application LAN WITH DYNAMICALLy SELECTABLE OPERATIONAL CAPABILITIES.

The transmit sequence for determining rate capabilities on a packet-by-packet basis is illustrated in FIG. 24. The flow chart of FIG. 24 represents the transmit sequence (204) illustrated in FIG. 21C for this circumstance. Entry results in determining (286) whether the transmission is a broadcast. If not, an inquiry, an FBE or an XFBE, is sent (288). An XFBE is identical to an FBE except that the XFBE has imbedded within its <SD> the capability information of the source node. Accordingly, an XFBE will look like an FBE to a standard node. If rate selection is done by the source node, it is not necessary to send an XFBE because an FBE will suffice. If rate selection is to be done by the destination node, the XFBE must be sent because the FBE does not contain the capability information of the source node. The destination node will need the capability information of the source node in order to make the decision.

After sending (288) the FBE or XFBE, a waiting loop is entered to detect (290) activity on the medium within a fixed time. If the activity is detected, the response will be decoded (292). If an ACK response is decoded (292) a normal packet PAC is sent (294). The normal PAC is also sent (294) if the transmission is a broadcast (286). Broadcasts are preferably sent at the common rate to insure their reception by all of the nodes of the LAN. If an XACK is decoded (292) this signifies that the destination node is capable of receiving at the enhanced rate. Accordingly, the enhanced packet XPAC will be sent (296). If any other type of response is decoded (292) the transmit sequence will be ended (298). The XACK may either be an affirmative XRSP or an ACK with capability information imbedded in its <SD>.

Implicit within the functionality of decoding (292) the response is the selection capability. If the source node is to select the data rate, the selection is made based on the capabilities of the source node and the imbedded rate information in the XRSP or XACK sent by the destination node. If the destination node has selected the transfer rate based on its capabilities and those indicated by the source node in the XFBE, that selection is also defined by the imbedded rate and status information in the XRSP or XACK. The selected data rate is illustrated by either sending the PAC (294) or sending the XPAC (296), since only two rates are interoperable as disclosed herein. Of course, if other enhanced rates were available, the selection among the various additional rates would be defined by the rate information contained in the XRSP and/or XENQ.

After sending (294) the normal packet or sending (296) the enhanced packet, the packet sent is checked (300) to determine if it is a broadcast. If not, a waiting loop is entered (302) to check for activity on the medium within a fixed time. If the activity is received within a fixed time, the activity is checked (304) to determine if the activity is an affirmative response. If affirmatively acknowledged, a packet acknowledgement will be indicated (306), the transmitter will be disabled (308) and the host computer of the node will be informed of a successful packet delivery. Thereafter, the transmit sequence will end (298). If activity has not been detected (302) within a fixed time after sending the PAC or XPAC (294 or 296), or if the activity detected is not an ACK or XACK (304) the transmitter will be disabled, the host will be informed (308), and the transmit sequence will also end (298). If activity in response to sending the inquiry has not been detected (290) within the fixed time after sending the FBE or the XFBE, or the PAC or XPAC sent (294 or 296) is determined (300) to be a broadcast, the transmitter will be disabled (308) and the host processor informed before ending (298) the transmit sequence.

The improvements available from the present invention allow it to be incorporated in an interoperable manner with basic interfaces and the basic protocol on a pre-existing LAN. Not only is the present invention available for use on existing LANs, but it is interoperative to provide substantially increased operational capabilities for data rate transfers, protocols, and other features. A pre-existing LAN of basic components need not be replaced to provide the enhanced capabilities between newly added or upgraded enhanced nodes. Other advantages and improvements are apparent.

Different embodiments of the present invention and their improvements have been described with a degree of particularity. It should be understood, however, that previous descriptions have been made by way of preferred example and that the scope of the present invention is defined by the following claims.

What is claimed:

1. A local area network or LAN, comprising:
a plurality of at least three nodes which include a first group having at least two of said nodes therein and a second group having at least two of said nodes therein;
a communication medium connecting the nodes;
interface means associated with the first group of nodes and operative for supplying signals to the medium to establish network operational activity and for communicating information between selected nodes in predetermined signals applied at selected regularly occurring intervals in compliance with a first predetermined communication protocol;
interface means associated with the second group of nodes and operative for supplying signals to the medium to establish network operational activity and for communicating information between selected nodes in predetermined signals applied at selected regularly occurring intervals in compliance with a second predetermined communication protocol; and wherein:
the first and second protocols are different; and
the signals are applied in predetermined patterns to create network operational activity in both protocols while simultaneously communicating information in a selected one of the first or second protocols.

2. A LAN as defined in claim 1 wherein:
the interface means at the nodes between which communication occurs selected one of the first or second protocol for information communication.

3. A LAN as defined in claim 1 wherein:
some nodes are common to both the first and second groups.

4. A LAN as defined in claim 1 wherein:
the intervals are of the same time duration in the first and second protocols.

5. A LAN as defined in claim 4 wherein:
the signals are applied in the first protocol in every other interval; and
the signals are applied in the second protocol in every consecutive interval.

6. A LAN as defined in claim 2 wherein:
the first group of nodes is all of the nodes; and
the second group of nodes is less than all of the nodes.

7. A LAN as defined in claim 6 wherein:
the signals are applied in the first protocol in every other interval;
the signals are applied in the second protocol in every consequential interval; and the intervals are of the same time duration in the first and second protocols.

8. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the interface means at the nodes between which communication occurs selects one of the first or second protocol for information communication;

communicating information between nodes occurs by transmitting and receiving frames;

the first group of nodes includes all of the nodes;

the second group of nodes includes less than all of the nodes;

each node of the second group is an enhances node;

each node which is not an enhanced node is a basic node;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

each frame communicated in the first protocol having signals occurring in the intervals appropriate to the first protocol, each frame communicated in the second protocol having signals occurring in the intervals appropriate to the second protocol, the signals in the intervals defining symbols, the symbols including: a silence symbol which is common to both the first and second protocols and which indicates the absence of a physical signal, a basic symbol indicating the presence of a physical signal of some magnitude greater than the absence of a physical signal and which is common to both the first and second protocols, a common symbol indicating either a silence or a basic symbol, a unique symbol indicating at least one predetermined physical signal of magnitude different than the common symbol and which is present only in the second protocol, and a set symbol indicating the presence of a common or a unique symbol but not a silence symbol;

all basic frames communicated in the first protocol are repetitions of one of common or silence symbols at consecutive intervals; and all enhanced frames communicated in the second protocol include an inserted symbol which is other than a silence symbol and which is inserted in at least one interval corresponding to the location of one of the silent symbols of a basic frame.

9. A LAN as defined in claim 8 wherein:

the inserted symbol is a unique symbol.

10. A LAN as defined in claim 8 wherein:

the basic and enhanced frames include a starting delimiter defined by an introductory group of common symbols; and the inserted symbol in enhanced frames is in the starting delimiter.

11. A LAN as defined in claim 10 of the token passing variety wherein:

a token frame designated as a token is communicated among the interface means in a loop to control access to the communication medium for communication between selected nodes; and at least one inserted symbol is in the starting delimiter of the token.

12. A LAN as defined in claim 11 wherein the inserted symbol is a unique symbol.

13. A LAN as defined in claim 11 wherein:

the inserted symbol is a set symbol which defines a code indicative of communication rate capabilities information of the enhanced node which passes the token.

14. A LAN as defined in claim 13 wherein:

the inserted symbol is a set symbol which defines information indicative of the status information of the enhanced node passing the token and of its present ability to transmit or receive communications.

15. A LAN as defined in claim 13 wherein:

a plurality of inserted symbols are present in the starting delimiter of the token;

one inserted symbol is a unique symbol; and at least one other inserted symbol defines the communication rate capabilities and status information of the enhanced node passing the token.

16. A LAN as defined in claim 10 wherein:

one enhanced frame defines an inquiry which is communicated to an enhanced destination node to determine communication rate capability information; and the inserted symbol is present in the starting delimiter.

17. A LAN as defined in claim 16 wherein:

the inserted symbol defines information indicative of the communication rate capabilities of the enhanced source node which sends the inquiry.

18. A LAN as defined in claim 17 wherein:

a plurality of inserted symbols are present in the starting delimiter of the token; and one inserted symbol is a unique symbol.

19. A LAN as defined in claim 16 wherein:

one enhanced frame defines a response which is communicated after receipt of an inquiry frame; and the inserted symbol is present in the starting delimiter of the response communicated in response to the inquiry.

20. A LAN as defined in claim 19 wherein:

the inserted symbol in the response defines information indicative of the communication rate capabilities of the enhanced destination node which sends the response.

21. A LAN as defined in claim 19 wherein:
one inserted symbol in the response defines information indicative of the status capabilities of the enhanced destination node to transmit and receive frames.

22. A LAN as defined in claim 11 wherein:
at least one other inserted symbol is present in the starting delimiter and the other inserted symbol defines the communication rate capabilities and status information of the enhanced node passing the token.

23. A local area network or LAN, comprising:
a plurality of at least three nodes which include a first group having at least two of said nodes therein and a second group having at least two of said nodes therein;
a communication medium connecting the nodes;
interface means associated with the first group of nodes and operative for supplying signals to the medium to establish network operational activity and for communicating information between selected nodes in predetermined signals applied at selected regularly occurring intervals in compliance with a first predetermined communication protocol;
interface means associated with the second group plurality of nodes and operative for supplying signals to the medium to establish network operational activity and for communicating information between selected nodes in predetermined signals applied at selected regularly occurring intervals in compliance with a second predetermined communication protocol; and wherein:
the first and second protocols are different; and
the signals are applied in predetermined patterns to create network operational activity in both protocols while simultaneously communicating information in a selected one of the first or second protocols;
the first group of nodes includes all of the nodes;
the second group of nodes includes less than all of the nodes;
each node of the second group is an enhanced node;
each node which is not an enhanced node is a basic node;
communicating information between nodes occurs by transmitting and receiving frames;
the interface means of the basic nodes communicate information to basic nodes in basic frames in the first protocol;
the interface means of the enhanced nodes communicate information to the basic nodes in basic frames in the first protocol and selectively communicate information to enhanced nodes in enhanced frames in the second protocol;
the first protocol for communication of a data packet frame between a source node and a destination node requires an inquiry frame sent from the source node to the destination node, followed by a response frame sent from the destination node to the source node, followed by a data packet frame sent from the source node to the destination node, followed by a response frame acknowledging successful receipt of the data packet sent from the destination node to the source node; and
the second protocol for communication of a data packet frame from an enhanced source node to an enhanced destination node requires a data packet frame sent from the enhanced source node to the enhanced destination node, followed by one of either an affirmative or negative response frame from the destination node to the source node indicating the successful or unsuccessful receipt of the data packet, respectively.

24. A LAN as defined in claim 23 wherein:
the second protocol optionally allows the interface means at an enhanced source node to send an inquiry to the destination node prior to sending the data packet; and
the first protocol requires the source node to send an inquiry to the destination node prior to sending the data packet frame.

25. A LAN as defined in claim 23 wherein:
the second protocol requires a destination node of a data packet frame to send back to the source node a negative response frame upon the unsuccessful receipt of a data packet frame sent by the source node; and
the first protocol does not require the destination node to communicate back to the source node a negative response frame upon the unsuccessful receipt of a data packet frame.

26. A LAN as defined in claim 25 wherein:
the second protocol requires the interface means of the enhanced destination node to include negative response information in the negative response frame indicating the reason for the unsuccessful receipt of the data packet frame.

27. A LAN as defined in claim 26 wherein:
the second protocol requires the interface means at the enhanced source node receiving a negative response frame from the enhanced destination node to send an inquiry frame prior to subsequently attempting to re-send the data packet frame, if the negative response information indicates that a subsequent re-sending of the data packet frame might be successful.

28. A LAN as defined in claim 24 of the token passing variety wherein:
a token frame designated as a token is communicated among the interface means in a loop to control access to the communication medium for communication between selected nodes;
the token frame includes information of the status of each enhanced node which passes the token; and
the second protocol requires the interface means at the enhanced source node to send an inquiry frame to the enhanced destination node prior to sending a data packet frame, if the enhanced source node detects an indication from the status information during the preceding token loop that the reception at the enhanced destination node may be unsuccessful.

29. A LAN as defined in claim 24 of the token passing variety wherein:
a token frame designated as a token is communicated among the interface means in a loop to control access to the communication medium for communication between selected nodes;
the token frame includes information of the status of each enhanced node which passes the token; and the second protocol requires the interface means at the enhanced source node to send an inquiry frame to the enhanced destination node prior to sending a data packet frame, if the enhanced source node detects indications in the status information during a predetermined number of preceding token loops that there is a probability of unsuccessful reception of the data packet at the enhanced destination node.

30. A LAN as defined in claim 23 wherein:

the second protocol optionally allows the interface means at an enhanced source node to send an inquiry to the destination node prior to sending the data packet; and the second protocol requires the interface means at an enhanced source node to send an inquiry frame to the destination node prior to sending a data packet frame of length greater than a predetermined amount to that destination node.

31. A LAN as defined in claim 23 wherein:

the second protocol optionally allows the interface means at an enhanced source node to send an inquiry to the destination node prior to sending the data packet; and the second protocol requires the interface means at an enhanced source node to send an inquiry frame to the destination node prior to sending a data packet frame to the destination node when a negative acknowledgement has been communicated between this pair of nodes during any one of a predetermined number of prior attempts to achieve communication between this pair of nodes.

32. A local area network or LAN of the token passing variety, comprising:

a plurality of at least three nodes which include a first group having at least two of said nodes therein and a second group having at least two of said nodes therein;

a communication medium connecting the nodes;

interface means associated with the first group plurality of nodes and operative for supplying signals to the medium to establish network operational activity and for communicating information between selected nodes in predetermined signals applied at selected regularly occurring intervals in compliance with a first predetermined communication protocol;

interface means associated with the second group plurality of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes, each node of the second group is an enhanced node;

communicating information between nodes occurs by transmitting and receiving frames;

a token frame designated as a token is communicated among the interface means of the basic and enhanced nodes in a normal token loop to control access to the communication medium for communication between selected nodes;

the token frame includes information of the status of each enhanced node which passes the token; and the second protocol allows the interface means associated with each enhanced node to redirect the token out of the normal token loop in accordance with the status information in the token.

33. A LAN as defined in claim 32 wherein:

the status information relates to whether the enhanced source node has further data frames waiting in a queue to be sent.

34. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group plurality of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

communicating information between nodes occurs by transmitting and receiving frames, each frame including at least one field;

data is communicated between nodes in a data packet frame;

a data packet frame communicated in the second protocol includes an error correcting code in a field of the data packet frame; and a data packet frame communicated in the first protocol does not include an error correcting code.

35. A LAN as defined in claim 34 wherein:

response to data packet frames are communicated between nodes in response frames in both the first and the second protocols; and a response frame communicated in the second protocol to a data packet frame which includes the error correcting code, includes information which distinguished error-free transmissions, transmissions with correctable errors which do not require re-transmission, and transmissions with uncorrectable errors which do require re-transmission.

36. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol; and broadcast frames are communicated only in the first protocol between all of the nodes.

37. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

the second protocol requires each enhanced node to communicate with other enhanced nodes using a frame containing status information regarding the capability of that enhanced node to transmit and receive frames; and the first protocol does not require any node to communicate status information regarding the capability of that node to transmit and receive frames.

38. A LAN as defined in claim 37 of the token passing variety wherein:

the frame in which the enhanced node communicates status information is a token.

39. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

the second protocol requires each enhanced node to communicate with other enhanced nodes using a frame containing rate information at which the enhanced node can receive data; and the first protocol does not require any node to communicate rate information at which any node can receive data.

40. A LAN as defined in claim 39 of the token passing variety wherein:

the frame in which the enhanced node communicates rate information is a token.

41. A local area network of LAN of the token passing variety, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

a token frame designated as a token is communicated among the interface means of the basic and enhanced nodes in a loop to control access to the communication medium for communication between selected nodes;

the second protocol allows the token to be passed from one enhanced node to another enhanced node at the highest rate capability which the enhanced node can receive the token; and the first protocol requires that the token be passed from each basic node at one predetermined rate.

42. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

the second protocol requires the interface means of each enhanced source node to insert a calibration signal periodically in each enhanced frame;

the second protocol requires the interface means of each enhanced destination node to utilize the calibration signal to adjust a receiver at the enhanced destination node; and the first protocol does not require any calibration signal to adjust a receiver at a basic destination node.

43. A LAN as defined in claim 42 wherein:

the second protocol communication data in amplitude modulated signals; and the first protocol communicates data in constant amplitude signals.

44. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

all enhanced frames communicated in the second protocol include a unique symbol which is present only in the second protocol; and the interface means of each enhanced node includes:

means for determining whether all frames received at the enhanced node include the unique symbol, means for decoding the frame as an enhanced frame upon determining that the unique symbol is present in the frame; and means for decoding the frame as a basic frame upon determining that the unique symbol is not present in the frame.

45. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

the interface means of each enhanced node includes:

memory means containing capability information of at least some of the other enhanced nodes, means for determining from the memory means if the destination node to which a frame is to be transmitted from the enhanced node is an enhanced node and what capability information is associated with the enhanced destination node, and means for selecting the rate of the transmission of the frame by the enhanced node to the destination node based on the capability information determined from the memory means.

46. A LAN as defined in claim 45 of the token passing variety wherein:

one frame designated as a token is communicated among the interface means in a loop to control access to the communication medium for communication between selected nodes; and delimiter of the token.

47. A local area network or LAN of the token passing variety, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each node which is not an enhanced node is a basic node;

each enhanced node has the capability to communicate in compliance with both the first and second protocols;

communicating information between nodes occurs by transmitting and receiving frames;

a token frame designated as a token is communicated among the interface means in a loop to control access to the communication medium for communication of frames between selected nodes;

the token selectively communicates capability information regarding an enhanced node;

the interface means of the enhanced nodes detect and decode the capability information; and the interface means of the basic nodes do not detect the capability information, and the capability information dues not interfere with the function of the token in achieving medium access control.

48. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each enhanced node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol; and the signals in enhanced frames which create the appearance of network operational activity in both protocols cannot be interpreted by the interface means at basic nodes as valid information.

49. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the interface means of all nodes communicate information in frames in both protocols; and at least some of frames available for communication in one protocol are different than the frames available for communication in the other protocol.

50. A local area network or LAN, comprising:

a plurality of nodes;

a communication medium connecting the nodes;

interface means associated with each of the nodes and operative for supplying signals defining frames to the medium to establish network operational activity and for communicating information between selected nodes in predetermined signals applied at selected regularly occurring intervals in compliance with a selected one of either a first or a second predetermined communication protocol;

and wherein:

the first and second protocols are different; and the signals are applied in both protocols in predetermined patterns to create network operational activity in both protocols while simultaneously communicating information in a selected one of the first or second protocols;

communicating information between nodes occurs by transmitting and receiving frames;

all of said nodes have the capability of communicating information in frames in both protocols; and the number of frames available for communication in one protocol are different than the number of frames available for communication in the other protocol.

51. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

communicating information between nodes occurs by transmitting and receiving frames;

one frame communicated in the second protocol achieving a communication function corresponding to that communication function achieved by a frame communicated in the second protocol;

each frame includes a plurality of fields, the frames which achieve corresponding communication functions in both protocols each have at least one similar field; and the similar field of a frame communicated in the second protocol has the capability of communicating more information than the similar field of the corresponding frame communicating in the first protocol.

52. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

communicating information between nodes occurs by transmitting and receiving frames, some of the frames are transmitted sequentially in both protocols;

sequentially transmitted frames are spaced by an interframe gap of a predetermined time interval; and the time length of the interframe gap between sequentially transmitted frames communicated in the first protocol is different than the time length of the interframe gap between sequentially transmitted frames communicated in the second protocol.

53. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a second predetermined communication protocol; and wherein:

the first and second protocols are different; and the signals are applied in predetermined patterns to create network operational activity in both protocols while simultaneously communicating information in a selected one of the first or second protocols;

the first group of nodes includes all of the nodes;

the second group of nodes includes less than all of the nodes;

each node of the second group is an enhanced node;

each enhanced node which is not an enhanced node is a basic node;

communicating information between nodes occurs by transmitting and receiving frames;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

all basic frames communicated in the first protocol are formed of signals defining basic symbols;

all enhanced frames communicated in the second protocol are formed of signals defining enhanced symbols, the enhanced symbols include a unique symbol which is present only at a predetermined location in enhanced frames communicated the second protocol; and the interface means of enhanced node includes:

means responsive to a symbol at the predetermined location where the unique symbol is present in enhanced frames and operative for detecting the capability of a path through the communication medium for communicating enhanced frames upon decoding the symbol at the predetermined location as a unique symbol, and operative for detecting the lack of capability of a path through the communication medium for communicating enhanced frames upon decoding the symbol at the predetermined location as a basic symbol which is present in the first protocol.

54. A LAN as defined in claim 53 wherein:

said means for detecting the capability and the lack of capability does so for individual pairs of enhanced nodes.

55. A local area network or LAN, comprising:

a plurality of at least three nodes which include a first group having at least two of said nodes therein and a second group having at least two of said nodes therein;

a communication medium connecting the nodes;

interface means associated with the first group of nodes and operative for supplying signals to the medium to establish network operational activity and for communicating information between selected nodes in predetermined signals applied at selected regularly occurring intervals in compliance with a first predetermined communication protocol;

interface means associated with the second group of nodes and operative for supplying signals to the medium to establish network operational activity and for communicating information between selected nodes in predetermined signals applied at selected regularly occurring intervals in compliance with a first predetermined communication protocol; and wherein:

the first and second protocols are different; and the signals are applied in predetermined patterns to create network operational activity in both protocols while simultaneously communicating information in a selected one of the first or second protocols;

the interface means at the nodes between which communication occurs selects one of the first or second protocol for information communication;

communicating information between nodes occurs by transmitting and receiving frames;

the first group of nodes includes all of the nodes;

the second group of nodes includes less than all of the nodes;

each node of the second group is an enhanced node;

each enhanced node which is not an enhanced node is a basic node;

the interface means of the basic nodes communicate information to basic nodes in basic frames in the first protocol;

the interface means of the enhanced nodes communicate information to the basic nodes in basic frames in the first protocol and selectively communicate information to enhanced nodes in enhanced frames in the second protocol;

each frame communicated in the first protocol having signals occurring in the intervals appropriate to the first protocol, each frame communicated in the second protocol having signals occurring in the intervals appropriate to the second protocol, the signals in the interval defining symbols, the symbols including one which is common to both the first and second protocols and which indicates the absence of a physical signal designated as a silence symbol, one indicating the presence of a physical signal of some magnitude greater than the absence of a physical signal and which is common to both the first and second protocols designated as a basic symbol, one indicating either a silence or a basic symbol designated as a common symbol, one indicating at least one predetermined physical signal of magnitude different than the common symbol and which is present only in the second protocol designated as a unique symbol, and one indicating the presence of a common or a unique symbol but not a silence symbol designated as a set symbol;

the signals are applied in the first protocol in every other interval;

the signals are applied in the second protocol in every consecutive interval;

the intervals are of the same time duration in the first and second protocols;

all basic frames communicated in the first protocol are repetitions of one of common or silence symbols at consecutive every other intervals; and all enhanced frames communicated in the second protocol include a symbol designated as an inserted symbol which is other than a silence symbol and which is inserted in at least one interval corresponding to the location of one of the silent symbols of a basic frame.

56. A LAN as defined in claim 55 wherein:

the inserted symbol is a unique symbol.

57. A LAN as defined in claim 55 wherein:

the basic and enhanced frames include a starting delimiter defined by an introductory group of common symbols; and the inserted symbol in enhanced frames is in the starting delimiter.

58. A LAN as defined in claim 57 of the token passing variety wherein:

one frame designated as a token is communicated among the interface means in a loop to control access to the communication medium for communication between selected nodes; and at least one inserted symbol is in the starting delimiter of the token.

59. A LAN as defined in claim 58 wherein the inserted symbol is a unique symbol.

60. A LAN as defined in claim 58 wherein:

the inserted symbol is a set symbol which defines a code indicative of communication rate capabilities information of the enhanced node which passes the token.

61. A LAN as defined in claim 60 wherein:

the inserted symbol is a set symbol which defines information indicative of the status information of the enhanced node passing the token indicating its present ability to transmit or receive communications.

62. A LAN as defined in claim 60 wherein:

a plurality of inserted symbols are present in the starting delimiter of the token;
one inserted symbol is a unique symbol; and
at least one other inserted symbol defines the communication rate capabilities and status information of the enhanced node passing the token.

63. A LAN as defined in claim 57 wherein:
one enhanced frame defines an inquiry which is communicated to an enhanced destination node to determine communication rate capability information; and
the inserted symbol is present in the starting delimiter.

64. A LAN as defined in claim 63 wherein:
the inserted symbol defines information indicative of the communication rate capabilities of the enhanced source node which sends the inquiry.

65. A LAN as defined in claim 64 wherein:
a plurality of inserted symbols are present in the starting delimiter of the token; and
one inserted symbol is a unique symbol.

66. A LAN as defined in claim 63 wherein:
one enhanced frame defines a response which is communicated after receipt of an inquiry frame; and
the inserted symbol is present in the starting delimiter of the response communicated in response to the inquiry.

67. A LAN as defined in claim 66 wherein:
the inserted symbol in the response defines information indicative of the communication rate capabilities of the enhanced destination node which sends the response.

68. A LAN as defined in claim 66 wherein:
one inserted symbol in the response defines information indicative of the status capabilities of the enhanced destination node to transmit and receive frames.

69. A LAN as defined in claim 58 wherein:
at least one other inserted symbol is present in the starting delimiter and the other inserted symbol defines the communication rate capabilities and status information of the enhanced node passing the token.

70. A method of communicating over a local area network or LAN which includes a plurality of at least three nodes, the plurality of said nodes including a first group having at least two of said nodes therein and including a second group having at least two of said nodes therein, a communication medium connecting the nodes, interface means associated with the first group of nodes and operative for supplying signals to the medium to establish network operational activity, and interface means associated with the second group of nodes and operative for supplying signals to the medium to establish network operational activity, the first group of nodes includes all of the nodes, the second group of nodes includes less than all of the nodes, each node of the second group is an enhanced node and each node of the first group is a basic node; said method comprising:
communicating information between selected basic nodes by applying predetermined signals at selected regularly occurring intervals from the interface means of the basis nodes in compliance with a first predetermined communication protocol;
communicating information between selected nodes by applying predetermined signals at selected regularly occurring intervals from the interface means of the enhanced nodes in compliance with one of the first or a second predetermined communication protocol;
applying signals in predetermined patterns in both protocols to create network operational activity in both protocols while simultaneously communicating information in only a selected one of the first or second protocols; and
differentiating between the first and second protocols by distinguishing the signals which communicate the information in the first and second protocols.

71. A method as defined in claim 70 further comprising:
selecting one of the first or second protocols for information communication by operation of the interface means at the enhanced nodes.

72. A method as defined in claim 70 further comprising:
establishing intervals of the same time duration in the first and second protocols.

73. A method as defined in claim 72 further comprising:
applying the signals in the first protocol in every other interval; and
applying the signals in the second protocol in every consecutive interval.

74. A method as defined in claim 71 further comprising:
communicating information between the interface means of all nodes in frames;
communicating information between basic nodes in basic frames in the first protocol;
communicating information from the enhanced nodes to the basic nodes in basic frames in the first protocol and selectively communicating information between enhanced nodes in enhanced frames in the second protocol;
defining each basic and enhanced frame by signals which occur in the intervals appropriate to the first and second protocol, respectively;
defining symbols by the signals in the intervals in each basic and enhanced frame, the symbols including: a silence symbol which is common to both the first and second protocols and which indicates the absence of a physical signal, a basic symbol indicating the presence of a physical signal of some magnitude greater than the absence of a physical signal and which is common to both the first and second protocols, a common symbol indicating either a silence or a basic symbol, a unique symbol indicating at least one predetermined physical signal of magnitude different than the common symbol and which is present only in the second protocol, and a set symbol indicating the presence of a common or a unique symbol but not a silence symbol;
repeating one of the common or silence symbols at consecutive intervals in all basic frames communicated in the first protocol; and
including an inserted symbol in all enhanced frames communicated in the second protocol, the inserted symbol being other than a silence symbol and inserted in at least one interval corresponding to the location of one of the silent symbols of a basic frame.

75. A method as defined in claim 74 wherein:
the inserted symbol is a unique symbol.

76. A method as defined in claim 74 further comprising:
including a starting delimiter defined by an introductory group of common symbols in each basic and enhanced frame; and
including the inserted symbol in enhanced frames in the starting delimiter.

77. A method as defined in claim 76 wherein the LAN is of the token passing variety and further comprising:
communicating one frame designated as a token among the interface means in a loop for controlling access to the communication medium for communicating between selected nodes; and
including at least one inserted symbol in the starting delimiter of the token.

78. A method as defined in claim 77 wherein the inserted symbol is a unique symbol.

79. A method as defined in claim 77 further comprising:
including a set symbol as the inserted symbol to define a code indicative of communication rate capabilities information of an enhanced node which passes the token.

80. A method as defined in claim 79 further comprising:
including a set symbol as the inserted symbol is a set symbol which defines information indicative of the status information of the enhanced node passing the token indicating its present ability to transmit or receive communications.

81. A method as defined in claim 79 further comprising:
including a plurality of inserted symbols in the starting delimiter of the token, at least one of which is a unique symbol; and
defining the communication rate capabilities and status information of the enhanced node passing the token by the inserted symbols.

82. A method as defined in claim 76 further comprising:
defining an inquiry in the form of an enhanced frame which is communicated to an enhanced destination node to determine communication rate capability information; and
including the inserted symbol in the starting delimiter in the inquiry frame.

83. A method as defined in claim 82 further comprising:
defining information indicative of the communication rate capabilities of the enhanced source node which sends the inquiry by the inserted symbol.

84. A method as defined in claim 82 further comprising:
defining a response in the form of an enhanced frame which is communicated after receipt of an inquiry frame; and
including the inserted symbol in the starting delimiter of response frame communicated in response to the inquiry frame.

85. A method as defined in claim 84 further comprising:
defining information indicative of the communication rate capabilities of the enhanced destination node which sends the response frame by the inserted symbol.

86. A method as defined in claim 84 further comprising:
defining information indicative of the status capabilities of the enhanced destination node to transmit and receive frames by one inserted symbol in the response frame.

87. A method as defined in claim 86 wherein:
including at least one other inserted symbol in the starting delimiter and the other inserted symbol defines the communication rate capabilities and status information of the enhanced node passing the token.

88. A method as defined in claim 71 further comprising:
communicating information between the interface means of all nodes in frames;
communicating information in basic frames in the first protocol;
communicating information from the enhanced nodes to the basic nodes in basic frames in the first protocol and selectively communicating information from enhanced nodes to enhanced nodes in enhanced frames in the second protocol;
using the first protocol to communicate a data packet frame between a source node and a destination node requires an inquiry frame sent from the source node to the destination node, followed by a response frame sent from the destination node to the source node, followed by a data packet frame sent from the source node to the destination node, followed by a response frame acknowledging successful receipt of the data packet sent from the destination node to the source node; and
using the second protocol to communicate a data packet frame from an enhanced source node to an enhanced destination node requires a data packet frame sent from the enhanced source node to the enhanced destination node, followed by one of either an affirmative or negative response frame from the destination node to the source node indicating the successful or unsuccessful receipt of the data packet, respectively.

89. A method as defined in claim 88 further comprising:
optionally allowing the interface means at an enhanced source node to send an inquiry frame to the destination node prior to sending the data packet frame, when communicating using the second protocol;
requiring the source node to send an inquiry frame to the destination node prior to sending the data packet frame, when communicating using the first protocol.

90. A method as defined in claim 88 wherein:
requiring a destination node of a data packet frame to send back to the source node a negative response frame upon the unsuccessful receipt of a data packet frame sent by the source node, when communicating using the second protocol; and
not requiring the destination node to communicate back to the source node a negative response frame upon the unsuccessful receipt of a data packet frame, when communicating using the first protocol.

91. A method as defined in claim 90 further comprising:
requiring the interface means of the enhanced destination node to include negative response information in the negative response frame indicating the reason for the unsuccessful receipt of the data packet frame, when communicating using the second protocol.

92. A method as defined in claim 91 wherein:
requiring the interface means at the enhanced source node receiving a negative response frame from the enhanced destination node to send an inquiry frame prior to subsequently attempting to re-send the data packet frame, if the negative response information indicates that a subsequent re-sending of the data packet frame might be successful, when communicating using the second protocol.

93. A method as defined in claim 89 wherein the LAN is of the token passing variety and further comprising:
a token frame is communicated among the interface means in a loop to control access to the communication medium for communication between selected nodes;
including in the token frame information of the status of each enhanced node which passes the token; and
requiring the interface means at the enhanced source node to send an inquiry frame to the enhanced destination node prior to sending a data packet frame, if the enhanced source node detects an indication from the status information during the preceding token loop that the reception at the enhanced destination node may be unsuccessful, when communicating using the second protocol.

94. A method as defined in claim 89 wherein the LAN is of the token passing variety and further comprising:
a token frame is communicated among the interface means in a loop to control access to the communication medium for communication between selected nodes;
including in the token frame information of the status of each enhanced node which passes the token; and
requiring the interface means at the enhanced source node to send an inquiry frame to the enhanced destination node prior to sending a data packet frame, if the enhanced source node detects an indication from the status information during a predetermined number of preceding token loops that there is a probability of unsuccessful reception of the data packet at the enhanced destination node, when communicating using the second protocol.

95. A method as defined in claim 88 further comprising, when communicating using the second protocol:
optionally allowing the interface means at an enhanced source node to send an inquiry to the destination node prior to sending the data packet; and
requiring the interface means at an enhanced source node to send an inquiry frame to the destination node prior to sending a data packet frame of length greater than a predetermined amount to that destination node.

96. A method as defined in claim 88 further comprising, when communicating using the second protocol:
optionally allowing the interface means at an enhanced source node to send an inquiry to the destination node prior to sending the data packet; and
requiring the interface means at an enhanced source node to send an inquiry frame to the destination node prior to sending a data packet frame to that destination node when a negative acknowledgement has been communicated between this pair of nodes during any one of a predetermined number of prior attempts to achieve communication between this pair of nodes.

97. A method as defined in claim 71 wherein the LAN is of the token passing variety and further comprising:
communicating information between the interface means of all nodes in frames;
communicating a token frame along the interface means in a loop to control access to the communication medium for communication between selected nodes;
including in the token frame information of the status of each enhanced node which passes the token; and
allowing the interface means associated with the enhanced nodes to redirect the token out of the normal token loop in accordance with the status information in the token, when communicating using the second protocol.

98. A method as defined in claim 97 wherein:
the status information relates to whether the enhanced source node has further data frames waiting in a queue to be sent.

99. A method as defined in claim 71 further comprising:
communicating information between the interface means of all nodes in frames;
communicating data between nodes in a data packet frame;
including in a data packet frame an error correcting code in a field of the data packet frame, when communicating using the second protocol; and
communicating a data packet frame which does not include an error correcting code, when communicating using the first protocol.

100. A method as defined in claim 99 further comprising:
communicating responses to data packet frames in response frames in both the first and the second protocols; and
communicating a response frame to a data packet frame which includes the error correcting code, including information which distinguishes error-free transmissions, transmissions with correctable errors which do not require re-transmission, and transmissions with uncorrectable errors which do require retransmission, when communicating using the second protocol.

101. A method as defined in claim 71 further comprising:
communication information between the interface means of all nodes in frames;
requiring each enhanced node to communicate a frame containing status information regarding the capability of that enhanced node to transmit and receive frames, when communicating using the second protocol; and
not requiring any node to communicate status information regarding the capability of that node to transmit and receive frames, when communicating using the first protocol.

102. A method as defined in claim 101 wherein the LAN is of the token passing variety and wherein:
the frame in which the enhanced node communicates status information is a token.

103. A method as defined in claim 71 further comprising:
communication information between the interface means of all nodes in frames;

requiring each enhanced node to communicate a frame containing rate information at which the enhanced node can receive data, when communicating using the second protocol; and not requiring any basic node to communicate rate information at which that basic node can receive data, when communicating using the first protocol.

104. A method as defined in claim 71 further comprising:

communication information between the interface means of all nodes in frames;

communicating a token frame among the interface means in a loop to control access to the communication medium for communication between selected nodes;

allowing the token to be passed from one enhanced node to another enhanced node at the highest rate capability which the enhanced node can receive the token, when communicating using the second protocol; and requiring the token to be passed from each basic node at one predetermined rate, when communicating using the first protocol.

105. A method as defined in claim 71 further comprising:

communicating information between the interface means of all nodes in frames;

communication information in basic frames in the first protocol;

communicating information from enhanced nodes to the basic nodes in basic frames in the first protocol and selectively communicating information from enhanced nodes to enhanced nodes in enhanced frames in the second protocol;

requiring the interface means of each enhanced source node to insert a calibration signal periodically in each enhanced frame, when communication using the second protocol;

requiring the interface means of each enhanced destination node to utilize the calibration signal to adjust a receiver at the enhanced destination node, when communicating using the second protocol; and not requiring any calibration signals to adjust a receiver at a basic destination node, when communicating using the first protocol.

106. A method as defined in claim 105 further comprising:

communicating data in amplitude modulated signals when using the second protocol; and communicating data in constant amplitude signals when using the first protocol.

107. A method as defined in claim 71 further comprising:

communicating information between the interface means of all nodes in frames;

communicating information in basic frames in the first protocol;

communicating information from enhanced nodes to the basic nodes in basic frames in the first protocol and selectively communicating information from enhanced nodes to enhance nodes in enhanced frames in the second protocol;

including in all enhanced frames communicated in the second protocol a unique symbol which is present only in the second protocol; and determining whether all frames received at the one enhanced node include the unique symbol;

decoding the frame as an enhanced frame upon determining that the unique symbol is present in the frame; and decoding the frame as a basic frame upon determining that the unique symbol is not present in the frame.

108. A method as defined in claim 71 further comprising:

communicating information between the interface means of all nodes in frames;

communicating information in basic frames in the first protocol;

communicating information from enhanced nodes to the basic nodes in basic frames in the first protocol and selectively communicating information from enhanced nodes to enhanced nodes in enhanced frames in the second protocol; and with respect to the interface means of each enhanced node:

storing in a memory containing capability information of at least some of the other enhanced nodes, determining from the stored capability information if the destination node to which a frame is to be transmitted is an enhanced node and the capability information associated with that enhanced destination node, and selecting the rate for transmission of the frame to the destination node based on the stored capability information.

109. A method as defined in claim 71 wherein the LAN is of the token passing variety and further comprising:

communicating information between the interface means of all nodes in frames;

communicating a token frame among the interface means in a loop to control access to the communication medium for communication between selected nodes;

selectively communicates capability information of an enhanced node passing the token by inserting capability information in the token passed from an enhanced node;

detecting and decoding the capability information at the interface means of the enhanced nodes;

not detecting the capability information at the interface means of the basic nodes; and avoiding interference with the function of the token frame in achieving medium access control by including the capability information in the token frame.

110. A method as defined in claim 71 further comprising:

communicating information between the interface means of all nodes in frames;

communication information in basic frames in the first protocol;

communicating information from enhanced nodes to the basic nodes in basic frames in the first protocol and selectively communicating information from enhanced nodes to enhanced nodes in enhanced frames in the second protocol;

not intrepreting at the basic nodes the signals in enhanced frames which create the appearance of network operational activity in both protocols.

111. A method as defined in claim 71 further comprising:

communicating information in frames in both protocols; and wherein:

the type of at least some of frames available for communication in one protocol are different than the type of some of frames available for communication in the other protocol.

112. A method as defined in claim 71 further comprising:
communicating information in frames in both protocols; and wherein:
the number of frames available for communication in one protocol are different than the number of frames available for communication in the other protocol.

113. A method as defined in claim 71 further comprising:
communicating information in frames in both protocols; and wherein:
each frame includes a plurality of fields; and
at least one field of a frame communicated in one protocol has the capability of communicating more information than the same field of a corresponding frame communicating in the other protocol.

114. A method as defined in claim 71 further comprising:
communicating information in frames in both protocols;
spacing sequential frames communicated by an interframe gap; and wherein:
the time length of the interframe gap in frames communicated in one protocol is different than the time length of the interframe gap in the frames communicated in the other protocol.

115. A method as defined in claim 71 further comprising:
communicating information between the interface means of all nodes in frames;
communicating information in basic frames in the first protocol;
communicating information from enhanced nodes to the basic nodes in basic frames in the first protocol and selectively communicating information from enhanced nodes to enhanced nodes in enhanced frames in the second protocol;
including in all enhanced frames communicated in the second protocol a unique symbol which is present only in the second protocol; and and with respect to the interface means of each enhanced node:
responding to a symbol at the location where the unique symbol is present in the communicated enhanced frame;
detecting the capability of a path through the communication medium for communicating enhanced frames upon decoding the received symbol as a unique symbol; and
detecting the lack of capability of a path through the communication medium for communicating enhanced frames upon decoding the received symbol as a basic symbol used only in the first protocol.

* * * * *

REEXAMINATION CERTIFICATE (4094th)

United States Patent [19]
Fischer et al.

[11] B1 5,008,879
[45] Certificate Issued May 30, 2000

[54] LAN WITH INTEROPERATIVE MULTIPLE OPERATIONAL CAPABILITIES

[75] Inventors: Michael A. Fischer; William M. Cox; Floyd H. McDougall, all of San Antonio, Tex.

[73] Assignee: Datapoint Corporation, San Antonio, Tex.

Reexamination Request:
No. 90/005,270, Feb. 23, 1999

Reexamination Certificate for:
Patent No.: 5,008,879
Issued: Apr. 16, 1991
Appl. No.: 07/270,641
Filed: Nov. 14, 1988

[51] Int. Cl.$^7$ .............................. H04J 3/02; H04J 3/24; H04L 12/28
[52] U.S. Cl. ................. 370/401; 340/825.5; 340/825.52; 370/466; 370/400; 370/410
[58] Field of Search ..................................... 370/389, 390, 370/391, 396, 400, 401, 402, 410, 445, 449, 450, 466, 465

[56] References Cited

FOREIGN PATENT DOCUMENTS

| 109964 | 6/1984 | European Pat. Off. . |
| 121188 | 10/1984 | European Pat. Off. . |

OTHER PUBLICATIONS

Michael Teener, "Reducing the Tower of Babel: The P1394 High Speed Serial Bus," Systems Architect, Networks and Communications National Semiconductor Corporation (Jan. 1987).

Bill Hawe, "Transparent Interconnection of Local Area Networks with Bridges," 3J. of Telecomm. Networks (1984).

George T. Koshy, "Understanding Multiple LANs: The Why and How of Linking Up," Data Communications (May 1986).

Andrew S. Tanenbaum, Computer Networks (2d ed. 1988).

Floyd E. Ross, "FDDI an Overview," IEEE Processing of Compcon (Spring 1987).

Information Processing Systems—Open Systems Interconnection—Transport Protocol Specification: ISO/TC97/SC16/WG6 12 Computer Communication Review 24, 33–34 (1982).

Draft Revised CCITT Recommendation X.25, 10 Computer Communication Review 56, 109, 113 (1980).

Transmission Control Protocol: DARPA Internet Program Protocol Specification Transmission Control Protocol: DARPA Internet Program Protocol Specification §§ 3.1, 3.4, (Sep. 1981) ("Transmission Control Protocol").

V.22 modem standard ("V.226bis").

*Primary Examiner*—Min Jung

[57] ABSTRACT

Two different communication protocols are interoperatively combined for use in a local area network (LAN). An enhanced protocol can be selected as an alternative to a common protocol during communication between enhanced nodes of the LAN. Signals communicated between nodes of the LAN in the first and second protocols create the appearance of valid activity in both protocols, and always communicate at least some valid information in one of the protocols and selectively communicate additional valid information in a second protocol. Preferably the signals applied in the second or enhanced protocol include signals which are inserted in such a way that they are transparent to the first protocol. Improved network management capabilities and data transfer rates are available as a result of the information communicated in the second protocol.

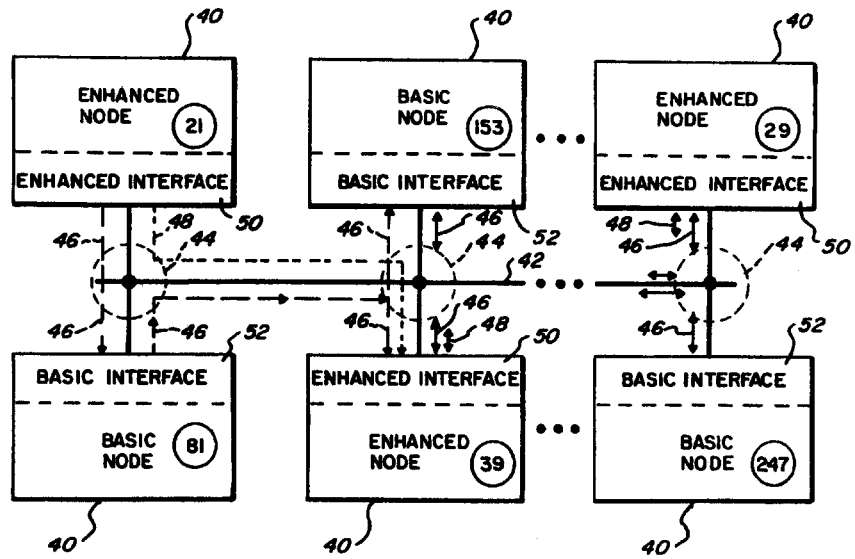

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–115 is confirmed.

* * * * *